United States Patent [19]

Wada et al.

[11] 4,426,307

[45] Jan. 17, 1984

[54] HEAT ACCUMULATIVE MATERIAL

[75] Inventors: Takahiro Wada, Katano; Ryoichi Yamamoto, Neyagawa, both of Japan

[73] Assignee: Matsushita Electric Industrial Co., Ltd., Osaka, Japan

[21] Appl. No.: 395,707

[22] Filed: Jul. 6, 1982

[30] Foreign Application Priority Data

| | | |
|---|---|---|
| Jul. 17, 1981 [JP] | Japan | 56-112494 |
| Aug. 13, 1981 [JP] | Japan | 56-127631 |
| Aug. 13, 1981 [JP] | Japan | 56-127632 |
| Dec. 7, 1981 [JP] | Japan | 56-197503 |
| Jan. 19, 1982 [JP] | Japan | 57-7051 |
| Feb. 17, 1982 [JP] | Japan | 57-24720 |
| Feb. 19, 1982 [JP] | Japan | 57-26225 |

[51] Int. Cl.$^3$ .............................................. C09K 5/06
[52] U.S. Cl. ....................................... 252/70; 564/63; 564/215; 562/575; 562/607
[58] Field of Search .................... 252/70; 564/63, 215; 562/575, 607

[56] References Cited

U.S. PATENT DOCUMENTS 3,559,594  2/1971  Miller ................................... 109/84

OTHER PUBLICATIONS

Hargraves, W. A. & Kresheck, G. C., "The Partial Molal Volume of Several Alcohols, Amino Acids, Carboxylic Acids and Salts in 6M Urea at 25°," J. Phys. Chem, 73 (10), 1969, pp. 3249–3254.

*Primary Examiner*—John E. Kittle
*Assistant Examiner*—Robert A. Wax
*Attorney, Agent, or Firm*—Stevens, Davis, Miller & Mosher

[57] ABSTRACT

A novel latent heat accumulative material capable of accumulating heat in a temperature range best suited for the storage of solar energy was obtained by adding an organic compound or compounds such as urea [$CO(NH_2)_2$] to a system consisting of sodium acetate ($CH_3CO_2Na$) and water ($H_2O$). Further addition of a crystal nucleus forming material or materials such as sodium pyrophosphate decahydrate ($Na_4P_2O_7 \cdot 10H_2O$) to said composition could minimize supercooling and allowed a wider scope of application of the present heat accumulative material.

10 Claims, 11 Drawing Figures

HEAT ACCUMULATIVE MATERIAL

This invention relates to a latent heat accumulative material useful for storing solar energy and such.

Generally, there are known two types of heat accumulative material, one type utilizing sensible heat of material and the other utilizing latent heat. The heat accumulative material of the type utilizing latent heat, as compared with the type utilizing sensible heat, is capable of accumulating a greater amount of heat per unit weight or unit volume and hence a less amount of the heat accumulative material is required for storing a required amount of heat, so that this type of heat accumulative material allows a reduction in size of the heat accumulator or regenerator. Also, the heat accumulative material utilizing latent heat has a salient feature that it would not be lowered in temperature with heat dissipation as seen in the heat accumulative material utilizing sensible heat and evolves heat of a constant temperature at the transition point. Particularly, the heat accumulative material utilizing the heat of fusion of an inorganic hydrate is noted for its high rate of heat accumulation per unit volume.

It is known that $CH_3CO_2Na.3H_2O$ (melting point: 58.2° C.) is a substance with an outstandingly high latent heat of fusion among the inorganic hydrates. However, the high melting point (58.2° C.) of this substance has been an obstacle to wide application of this substance to the heat accumulating devices and other systems utilizing solar heat. Various methods for lowering the melting point of this substance, such as adding various kinds of acetates or other inorganic salts to this substance, have been proposed, but any of these methods would cause a substantial reduction of latent heat of fusion with drop of the melting point and thus the practical application of these methods has been difficult.

The present invention is to provide a novel heat accumulative material which is uncostly and has a stabilized heat absorbing and evolving performance and which is composed of a system comprising sodium acetate ($CH_3CO_2Na$) and water ($H_2O$) mixed with at least one compound selected from the group consisting of urea [$CO(NH_2)_2$], acetamide ($CH_3CONH_2$), formamide ($HCONH_2$), glycine ($NH_2CH_2CO_2H$) and alanine [$CH_3(NH_2)CHCO_2H$], said composite material being controllable in heat accumlating temperature and heat evolving temperature by suitably varying the component proportions thereof.

In case the three-component system of this invention is composed of $CH_3CO_2Na$, $H_2O$ and $CO(NH_2)_2$, these components are preferably mixed at the following proportions: $CH_3CO_2Na$ in the range of 20 to 70% by weight, $CO(NH_2)_2$ in the range not greater than 65% by weight (exclusive of 0%) and $H_2O$ in the range of 15 to 50% by weight, all based on the total weight of the three components. More preferably, the composition comprises $CH_3CO_2Na.3H_2O$ and $CO(NH_2)_2$ as both end components, with $CO(NH_2)_2$ being contained in an amount not greater than 50% by weight (exclusive of 0%) based on the total weight of the three components. In the case of the $CH_3CO_2Na-H_2O-CH_3CONH_2$ three-component system, these three components are preferably mixed with such that $CH_3CO_2Na$ is within the range of 10 to 70% by weight, $CH_3CONH_2$ is 80% by weight or less (exclusive of 0%) and $H_2O$ is within the range of 10 to 50% by weight, based on the total weight of the three components. More preferably, the composition comprises $CH_3CO_2Na.3H_2O$ and $CH_3CONH_2$ as both end components and contains $CH_3CONH_2$ in an amount of 75% by weight or less (exclusive of 0%) based on the total weight of the three components.

In case the three-component system of this invention is made up of $CH_3CO_2Na$, $H_2O$ and $HCONH_2$, said three components are preferably mixed at the proportions of 30 to 70% by weight for $CH_3CO_2Na$, 50% by weight or less (exclusive of 0%) for $HCONH_2$ and 15 to 45% by weight for $H_2O$, respectively, based on the total weight of the composition, and more preferably the composition comprises $CH_3CO_2Na.3H_2O$ and $HCONH_2$ as both and components in which $HCONH_2$ is contained at a proportion of 40% by weight or less (exclusive of 0%).

When the three-component system of this invention consists of $CH_3CO_2Na$, $H_2O$ and $NH_2CH_2CO_2H$, it is preferable that $CH_3CO_2Na$ be contained in an amount of 30 to 70% by weight, $NH_2CH_2CO_2H$ in an amount of 40% by weight or less (exclusive of 0%) and $H_2O$ in an amount of 20 to 50% by weight based on the total weight of the composition, and it is more preferable when the composition comprises $CH_3CO_2Na.3H_2O$ and $NH_2CH_2CO_2H$ as both end components with $NH_2CH_2CO_2H$ being contained in an amount of 30% by weight or less (exclusive of 0%).

Where the three-component system of this invention comprises $CH_3CO_2Na$, $H_2O$ and $CH_3(NH_2)CHCO_2H$, the preferred proportions of these three components are 35 to 70% by weight for $CH_3CO_2Na$, 35% by weight or less (exclusive of 0%) for $CH_3(NH_2)CHCO_2H$ and 20 to 55% by weight for $H_2O$, based on the total weight of the composition, and more preferably the composition is formed from $CH_3CO_2Na.3H_2O$ and $CH_3(NH_2)CHCO_2H$ as both end components and contains $CH_3(NH_2)CHCO_2H$ at a proportion of 25% by weight or less (exclusive of 0%).

In case the material of this invention is composed of a $CH_3CO_2Na.H_2O-CO(NH_2)_2-NH_2CH_2CO_2H$ four-component system, the preferred mixing ratios of these four components in the composition are such that $CH_3CO_2Na$ is 20 to 70% by weight, $CO(NH_2)_2$ is 65% by weight or less (exclusive of 0%), $NH_2CH_2CO_2H$ is 30% by weight or less (exclusive of 0%) and $H_2O$ is 15 to 50% by weight, based on the total weight of the four components.

Figure 1:
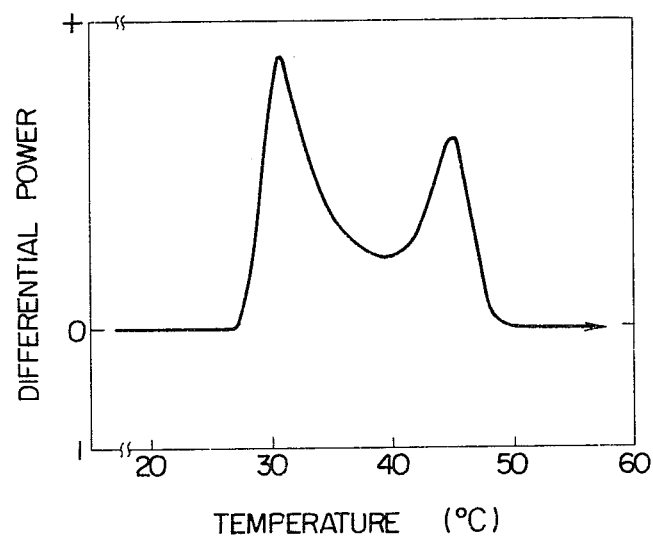
FIG. 1 is a DSC curve of Sample 5 as measured under heating by a DSC (differential scanning calorimeter) of Model SSC-560-S by Daini Seikosha Co., Ltd., said Sample 5 containing 80% by weight of $CH_3CO_2Na.3H_2O$ and 20% by weight of $CO(NH_2)_2$.

The embodiments of heat accumulative material according to this invention are described in detail hereinafter.

By using $CH_3CO_2Na$, $CH_3CO_2Na.3H_2O$, $CO(NH_2)_2$, $CH_3CONH_2$, $HCONH_2$, $NH_2CH_2CO_2H$ and $CH_3(NH_2)CHCO_2H$ (commercially available special grade chemicals) and distilled and ion-exchanged $H_2O$, there were prepared the composition samples by blending said materials in the predetermined amounts as shown in Tables 1 to 14, and the quantity of latent heat and transition temperature of each of these samples were measured by using a differential scanning calorimeter (DSC). The quantity of latent heat was determined from the heat absorption peak area on the DSC curve of each sample when melted, and the transition temperature was determined from the position of such peak. When two heat absorption peaks were observed, the temperatures at the respective peaks were shown. Appearance of two peaks is indicative of successive occurrence of fusion between these temperatures. As for latent heat, the value calculated from the sum of the respective peak areas was given. Any transition at a temperature below 0° C. was ignored as such transition is considered to be of no account for the discussion of the subject matter.

As for "Evaluation" shown in Tables 15 to 18, a symbol of o was given to the samples showing latent heat of 30 cal/g or above, a symbol of Δ to the samples showing latent heat of not less than 20 cal/g and not greater than 30 cal/g, and a symbol of x to other samples. The samples marked with a symbol of o have a sufficient heat accumulating capacity to serve for practical applications. The samples marked with a symbol of Δ, although not so high in the heat accumulating capacity, are deemed to be well serviceable for practical use because the transition temperature thereof is in a range different from those of the conventional latent heat accumulative materials.

Shown in Table 1 are the specimens of the compositions comprising $CH_3CO_2Na.3H_2O$ and $CO(NH_2)_2$ as both end components, and Table 2 shows the samples of the compositions neighboring that which comprises $CH_3CO_2Na.3H_2O$ and $CO(NH_2)_2$ as both end components. The results of measurements of these samples are shown in Tables 15 and 16, respectively.

Table 3 shows the specimens of the compositions comprising $CH_3CO_2Na.3H_2O$ and $CH_3CONH_2$ as both end components, and Table 4 shows the samples of the compositions environing those comprising $CH_3CO_2Na.3H_2O$ and $CH_3CONH_2$ as both end components said above. The results of determinations on these specimens are shown in Tables 17 and 18, respectively.

Table 5 shows the samples of the compositions comprising $CH_3CO_2Na.3H_2O$ and $HCONH_2$ as both end components, and Table 6 shows the samples of the compositions environing the said compositions comprising $CH_3CH_2Na.3H_2O$ and $HCONH_2$ as both end components. The results of determinations on these samples are shown in Tables 19 and 20, respectively.

Table 7 shows the samples of the compositions comprising $CH_3CO_2Na.3H_2O$ and $NH_2CH_2CO_2H$ as both end components, and Table 8 shows the specimens of the compositions circumjacent to said compositions comprising $CH_3CO_2Na.3H_2O$ and $NH_2CH_2CO_2H$ as both end components. The results of determinations on these specimens are shown in Tables 21 and 22, respectively.

Table 9 shows the samples of the compositions comprising $CH_3CO_2Na.3H_2O$ and $CH_3(NH_2)CHCO_2H$ as both end components, and Table 10 shows the samples of the compositions neighboring said compositions comprising $CH_3CO_2Na.3H_2O$ and $CH_3(NH_2)COCO_2H$ as both end components. The results of determinations on these samples are shown in Tables 23 and 24, respectively.

Table 11 shows the samples having the compositions prepared by adding $NH_2CH_2CO_2H$ to a system consisting of $CH_3CO_2Na.3H_2O$ and $CO(NH_2)_2$ as both end components and containing 37% by weight of $CO(NH_2)_2$, and Table 12 shows the samples having the compositions prepared by adding $CO(NH_2)_2$ to a system comprising $CH_3CO_2Na.3H_2O$ and $NH_2CH_2CO_2H$ as both end components and containing 15% by weight of $NH_2CH_2CO_2H$. Table 13 shows the samples having the compositions circumjacent to those of the samples of Tables 11 and 12, in which the ratio of $CH_3CO_2Na$ to $H_2O$ is kept constant so that the compositions are of a fixed $CH_3CO_2Na.3H_2O$ ratio. Table 14 shows the specimens of the compositions environing those of the samples of Tables 11, 12 and 13, in which the content of $NH_2CH_2CO_2H$ is kept constant while the compositional ratios of $CO(NH_2)_2$, $CH_3CO_2Na$ and $H_2O$ are varied. The results of determination on these samples are shown in Tables 25 to 28, respectively.

TABLE 1

| Sample No. | Composition (% by weight) | | |
|---|---|---|---|
| | $CH_3CO_2Na$ | $CO(NH_2)_2$ | $H_2O$ |
| 1 | 60.2 | 0.2 | 39.6 |
| 2 | 60.1 | 0.4 | 39.5 |
| 3 | 59.0 | 2.1 | 38.9 |
| 4 | 57.8 | 4.1 | 38.1 |
| 5 | 48.2 | 20.0 | 31.8 |
| 6 | 45.2 | 25.0 | 29.8 |
| 7 | 42.2 | 30.0 | 27.8 |
| 8 | 38.9 | 35.5 | 25.6 |
| 9 | 36.0 | 40.0 | 23.8 |
| 10 | 30.1 | 50.0 | 19.6 |
| 11 | 22.5 | 62.5 | 15.0 |
| 12 | 19.6 | 67.5 | 12.9 |

TABLE 2

| Sample No. | Composition (% by weight) | | |
|---|---|---|---|
| | $CH_3CO_2Na$ | $CO(NH_2)_2$ | $H_2O$ |
| 13 | 35.0 | 10.0 | 55.0 |
| 14 | 40.0 | 10.0 | 50.0 |
| 15 | 45.0 | 10.0 | 45.0 |
| 16 | 50.0 | 10.0 | 40.0 |
| 17 | 55.0 | 10.0 | 35.0 |
| 18 | 60.0 | 10.0 | 30.0 |
| 19 | 65.0 | 10.0 | 25.0 |
| 20 | 70.0 | 10.0 | 20.0 |
| 21 | 75.0 | 10.0 | 15.0 |
| 22 | 40.0 | 20.0 | 40.0 |
| 23 | 50.0 | 20.0 | 30.0 |
| 24 | 60.0 | 20.0 | 20.0 |
| 25 | 15.0 | 40.0 | 45.0 |
| 26 | 20.0 | 40.0 | 40.0 |
| 27 | 25.0 | 40.0 | 35.0 |
| 28 | 30.0 | 40.0 | 30.0 |
| 29 | 35.0 | 40.0 | 25.0 |
| 30 | 40.0 | 40.0 | 20.0 |
| 31 | 45.0 | 40.0 | 15.0 |
| 32 | 50.0 | 40.0 | 10.0 |

TABLE 3

| Sample No. | Composition (% by weight) | | |
|---|---|---|---|
| | $CH_3CO_2Na$ | $CH_3CONH_2$ | $H_2O$ |
| 33 | 60.15 | 0.25 | 39.60 |
| 34 | 59.98 | 0.50 | 39.52 |
| 35 | 59.07 | 2.0 | 38.93 |
| 36 | 57.27 | 5.0 | 37.73 |
| 37 | 54.25 | 10.0 | 35.75 |
| 38 | 51.24 | 15.0 | 33.76 |
| 39 | 48.22 | 20.0 | 31.78 |
| 40 | 45.21 | 25.0 | 29.79 |

TABLE 3-continued

| Sample No. | Composition (% by weight) | | |
|---|---|---|---|
| | $CH_3CO_2Na$ | $CH_3CONH_2$ | $H_2O$ |
| 41 | 42.20 | 30.0 | 27.80 |
| 42 | 39.18 | 35.0 | 25.82 |
| 43 | 36.17 | 40.0 | 23.83 |
| 44 | 33.15 | 45.0 | 21.85 |
| 45 | 30.14 | 50.0 | 19.86 |
| 46 | 27.13 | 55.0 | 17.87 |
| 47 | 24.11 | 60.0 | 15.89 |
| 48 | 21.10 | 65.0 | 13.90 |
| 49 | 18.08 | 70.0 | 11.92 |
| 50 | 15.07 | 75.0 | 9.93 |
| 51 | 12.06 | 80.0 | 7.94 |
| 52 | 10.25 | 83.0 | 6.75 |
| 53 | 7.84 | 87.0 | 5.16 |

TABLE 4

| Sample No. | Composition (% by weight) | | |
|---|---|---|---|
| | $CH_3CO_2Na$ | $CH_3CONH_2$ | $H_2O$ |
| 54 | 30 | 15 | 55 |
| 55 | 35 | " | 50 |
| 56 | 40 | " | 45 |
| 57 | 45 | " | 40 |
| 58 | 50 | " | 35 |
| 59 | 55 | " | 30 |
| 60 | 60 | " | 25 |
| 61 | 65 | " | 20 |
| 62 | 70 | " | 15 |
| 63 | 75 | " | 10 |
| 64 | 5 | 60 | 35 |
| 65 | 10 | " | 30 |
| 66 | 15 | " | 25 |
| 67 | 20 | " | 20 |
| 68 | 25 | " | 15 |
| 69 | 30 | " | 10 |
| 70 | 35 | " | 5 |
| 71 | 37 | " | 3 |

TABLE 5

| Sample No. | Composition (% by weight) | | |
|---|---|---|---|
| | $CH_3CO_2Na$ | $HCONH_2$ | $H_2O$ |
| 72 | 60.2 | 0.20 | 39.6 |
| 73 | 59.7 | 1.0 | 39.3 |
| 74 | 58.8 | 2.5 | 38.7 |
| 75 | 57.3 | 5.0 | 37.7 |
| 76 | 54.3 | 10.0 | 35.7 |
| 77 | 51.2 | 15.0 | 33.8 |
| 78 | 48.2 | 20.0 | 31.8 |
| 79 | 45.2 | 25.0 | 29.8 |
| 80 | 42.2 | 30.0 | 27.8 |
| 81 | 39.2 | 35.0 | 25.8 |
| 82 | 36.2 | 40.0 | 23.8 |
| 83 | 33.2 | 45.0 | 21.8 |
| 84 | 30.1 | 50.0 | 19.9 |
| 85 | 27.1 | 55.0 | 17.9 |
| 86 | 24.1 | 60.0 | 15.9 |

TABLE 6

| Sample No. | Composition (% by weight) | | |
|---|---|---|---|
| | $CH_3CO_2Na$ | $HCONH_2$ | $H_2O$ |
| 87 | 35 | 10 | 55 |
| 88 | 40 | 10 | 50 |
| 89 | 45 | 10 | 45 |
| 90 | 50 | 10 | 40 |
| 91 | 55 | 10 | 35 |
| 92 | 60 | 10 | 30 |
| 93 | 65 | 10 | 25 |
| 94 | 70 | 10 | 20 |
| 95 | 75 | 10 | 15 |
| 96 | 20 | 30 | 50 |
| 97 | 25 | 30 | 45 |
| 98 | 30 | 30 | 40 |
| 99 | 35 | 30 | 35 |

TABLE 6-continued

| Sample No. | Composition (% by weight) | | |
|---|---|---|---|
| | $CH_3CO_2Na$ | $HCONH_2$ | $H_2O$ |
| 100 | 40 | 30 | 30 |
| 101 | 45 | 30 | 25 |
| 102 | 50 | 30 | 20 |
| 103 | 55 | 30 | 15 |
| 104 | 60 | 30 | 10 |

TABLE 7

| Sample No. | Composition (% by weight) | | |
|---|---|---|---|
| | $CH_3CO_2Na$ | $NH_2CH_2CO_2H$ | $H_2O$ |
| 105 | 60.2 | 0.2 | 39.6 |
| 106 | 60.0 | 0.5 | 39.5 |
| 107 | 59.1 | 2.0 | 38.9 |
| 108 | 57.3 | 5.0 | 37.7 |
| 109 | 55.8 | 7.5 | 36.7 |
| 110 | 54.3 | 10.0 | 35.7 |
| 111 | 52.7 | 12.5 | 34.8 |
| 112 | 51.2 | 15.0 | 33.8 |
| 113 | 48.2 | 20.0 | 31.8 |
| 114 | 42.2 | 30.0 | 27.8 |
| 115 | 36.2 | 40.0 | 23.8 |
| 116 | 33.2 | 45.0 | 21.8 |

TABLE 8

| Sample No. | Composition (% by weight) | | |
|---|---|---|---|
| | $CH_3CO_2Na$ | $NH_2CH_2CO_2H$ | $H_2O$ |
| 117 | 40.0 | 5.0 | 55.0 |
| 118 | 45.0 | 5.0 | 50.0 |
| 119 | 50.0 | 5.0 | 45.0 |
| 120 | 55.0 | 5.0 | 40.0 |
| 121 | 60.0 | 5.0 | 35.0 |
| 122 | 65.0 | 5.0 | 30.0 |
| 123 | 70.0 | 5.0 | 25.0 |
| 124 | 75.0 | 5.0 | 20.0 |
| 125 | 50.0 | 10.0 | 40.0 |
| 126 | 45.0 | 20.0 | 35.0 |
| 127 | 25.0 | 25.0 | 50.0 |
| 128 | 30.0 | 25.0 | 45.0 |
| 129 | 35.0 | 25.0 | 40.0 |
| 130 | 40.0 | 25.0 | 35.0 |
| 131 | 45.0 | 25.0 | 30.0 |
| 132 | 50.0 | 25.0 | 25.0 |
| 133 | 55.0 | 25.0 | 20.0 |
| 134 | 60.0 | 25.0 | 15.0 |

TABLE 9

| Sample No. | Composition (% by weight) | | |
|---|---|---|---|
| | $CH_3CO_2Na$ | $CH_3(NH_2)CHCO_2H$ | $H_2O$ |
| 135 | 60.13 | 0.25 | 39.62 |
| 136 | 59.98 | 0.50 | 39.52 |
| 137 | 59.07 | 2.0 | 38.98 |
| 138 | 57.27 | 5.0 | 37.73 |
| 139 | 55.76 | 7.5 | 36.74 |
| 140 | 54.25 | 10.0 | 35.75 |
| 141 | 51.24 | 15.0 | 33.76 |
| 142 | 48.22 | 20.0 | 31.78 |
| 143 | 45.21 | 25.0 | 29.79 |
| 144 | 42.20 | 30.0 | 27.80 |
| 145 | 39.18 | 35.0 | 25.82 |
| 146 | 36.17 | 40.0 | 23.83 |

TABLE 10

| Sample No. | Composition (% by weight) | | |
|---|---|---|---|
| | $CH_3CO_2Na$ | $CH_3(NH_2)CHCO_2H$ | $H_2O$ |
| 147 | 35 | 5 | 60 |
| 148 | 40 | 5 | 55 |
| 149 | 45 | 5 | 50 |
| 150 | 50 | 5 | 45 |
| 151 | 55 | 5 | 40 |

TABLE 10-continued

| Sample No. | Composition (% by weight) | | |
|---|---|---|---|
| | $CH_3CO_2Na$ | $CH_3(NH_2)CHCO_2H$ | $H_2O$ |
| 152 | 60 | 5 | 35 |
| 153 | 65 | 5 | 30 |
| 154 | 70 | 5 | 25 |
| 155 | 75 | 5 | 20 |
| 156 | 30 | 15 | 55 |
| 157 | 35 | 15 | 50 |
| 158 | 40 | 15 | 45 |
| 159 | 45 | 15 | 40 |
| 160 | 50 | 15 | 35 |
| 161 | 55 | 15 | 30 |
| 162 | 60 | 15 | 25 |
| 163 | 65 | 15 | 20 |
| 164 | 70 | 15 | 15 |

TABLE 11

| Sample No. | Composition (% by weight) | | | |
|---|---|---|---|---|
| | $CH_3CO_2Na$ | $CO(NH_2)_2$ | $NH_2CH_2CO_2H$ | $H_2O$ |
| 165 | 37.6 | 36.9 | 0.2 | 25.0 |
| 166 | 37.8 | 36.8 | 0.5 | 24.9 |
| 167 | 37.6 | 36.6 | 1.0 | 24.8 |
| 168 | 37.2 | 36.3 | 2.0 | 24.5 |
| 169 | 36.5 | 35.5 | 4.0 | 24.0 |
| 170 | 35.7 | 34.8 | 6.0 | 23.5 |
| 171 | 35.0 | 34.0 | 8.0 | 23.0 |
| 172 | 34.2 | 33.3 | 10.0 | 22.5 |
| 173 | 33.4 | 32.6 | 12.0 | 22.0 |
| 174 | 32.7 | 31.8 | 14.0 | 21.5 |

TABLE 12

| Sample No. | Composition (% by weight) | | | |
|---|---|---|---|---|
| | $CH_3CO_2Na$ | $CO(NH_2)_2$ | $NH_2CH_2CO_2H$ | $H_2O$ |
| 175 | 51.1 | 0.2 | 15.0 | 33.7 |
| 176 | 51.0 | 0.5 | 14.9 | 33.6 |
| 177 | 50.2 | 2.0 | 14.7 | 33.1 |
| 178 | 49.2 | 4.0 | 14.4 | 32.4 |
| 179 | 41.0 | 20.0 | 12.0 | 27.0 |
| 180 | 38.4 | 25.0 | 11.3 | 25.3 |
| 181 | 35.9 | 30.0 | 10.5 | 23.6 |
| 182 | 33.3 | 35.0 | 9.8 | 21.9 |
| 183 | 30.8 | 40.0 | 9.0 | 20.2 |
| 184 | 28.2 | 45.0 | 8.3 | 18.5 |

TABLE 13

| Sample No. | Composition (% by weight) | | | |
|---|---|---|---|---|
| | $CH_3CO_2Na$ | $CO(NH_2)_2$ | $NH_2CH_2CO_2H$ | $H_2O$ |
| 185 | 56.8 | 1.0 | 5.0 | 37.2 |
| 186 | 54.3 | 5.0 | 5.0 | 35.7 |
| 187 | 51.3 | 10.0 | 5.0 | 33.7 |
| 188 | 45.2 | 20.0 | 5.0 | 29.8 |
| 189 | 39.2 | 30.0 | 5.0 | 25.8 |
| 190 | 33.2 | 40.0 | 5.0 | 21.8 |
| 191 | 53.7 | 1.0 | 10.0 | 35.3 |
| 192 | 51.3 | 5.0 | 10.0 | 33.7 |
| 193 | 48.2 | 10.0 | 10.0 | 31.8 |
| 194 | 42.2 | 20.0 | 10.0 | 27.8 |
| 195 | 36.2 | 30.0 | 10.0 | 23.8 |
| 196 | 30.2 | 40.0 | 10.0 | 19.8 |
| 197 | 47.6 | 1.0 | 20.0 | 31.4 |
| 198 | 45.2 | 5.0 | 20.0 | 29.8 |
| 199 | 42.2 | 10.0 | 20.0 | 27.8 |
| 200 | 36.2 | 20.0 | 20.0 | 23.8 |
| 201 | 44.6 | 1.0 | 25.0 | 29.4 |
| 202 | 42.2 | 5.0 | 25.0 | 27.8 |
| 203 | 41.6 | 1.0 | 30.0 | 27.4 |
| 204 | 38.6 | 1.0 | 35.0 | 25.4 |

TABLE 14

| Sample No. | Composition (% by weight) | | | |
|---|---|---|---|---|
| | $CH_3CO_2Na$ | $CO(NH_2)_2$ | $NH_2CH_2CO_2H$ | $H_2O$ |
| 205 | 35.0 | 9.0 | 1.0 | 55.0 |
| 206 | 40.0 | 9.0 | 1.0 | 50.0 |
| 207 | 45.0 | 9.0 | 1.0 | 45.0 |
| 208 | 50.0 | 9.0 | 1.0 | 40.0 |
| 209 | 55.0 | 9.0 | 1.0 | 35.0 |
| 210 | 60.0 | 9.0 | 1.0 | 30.0 |
| 211 | 65.0 | 9.0 | 1.0 | 25.0 |
| 212 | 70.0 | 9.0 | 1.0 | 20.0 |
| 213 | 75.0 | 9.0 | 1.0 | 15.0 |
| 214 | 15.0 | 39.0 | 1.0 | 45.0 |
| 215 | 20.0 | 39.0 | 1.0 | 40.0 |
| 26 | 25.0 | 39.0 | 1.0 | 35.0 |
| 217 | 30.0 | 39.0 | 1.0 | 30.0 |
| 218 | 35.0 | 39.0 | 1.0 | 25.0 |
| 219 | 40.0 | 39.0 | 1.0 | 20.0 |
| 220 | 45.0 | 39.0 | 1.0 | 15.0 |
| 221 | 50.0 | 39.0 | 1.0 | 10.0 |
| 222 | 30.1 | 49.0 | 1.0 | 19.9 |
| 223 | 22.6 | 61.5 | 1.0 | 14.9 |
| 224 | 19.6 | 66.5 | 1.0 | 12.9 |

TABLE 15

| Sample No. | Transition temperature (°C.) | Latent heat (cal/g) | Evaluation |
|---|---|---|---|
| 1 | 57.9 | 63 | o |
| 2 | 57.6 | 63 | o |
| 3 | 56.2 | 62 | o |
| 4 | 55.1 | 61 | o |
| 5 | 44.8, 32.1 | 58 | o |
| 6 | 41.2, 32.4 | 57 | o |
| 7 | 32.4 | 56 | o |
| 8 | 31.4 | 55 | o |
| 9 | 30.6 | 54 | o |
| 10 | 29.7 | 38 | o |
| 11 | 27.2 | 25 | Δ |
| 12 | 20.3 | 12 | x |

TABLE 16

| Sample No. | Transition temperature (°C.) | Latent heat (cal/g) | Evaluation |
|---|---|---|---|
| 13 | 36.8 | 10 | x |
| 14 | 44.3 | 20 | Δ |
| 15 | 47.0 | 24 | Δ |
| 16 | 48.2 | 35 | o |
| 17 | 48.7, 30.2 | 58 | o |
| 18 | 49.4, 30.2 | 55 | o |
| 19 | 50.2, 30.4 | 45 | o |
| 20 | 51.1, 30.4 | 38 | o |
| 21 | 51.3, 30.5 | 19 | x |
| 22 | 42.7, 22.0 | 33 | o |
| 23 | 45.1, 29.2 | 52 | o |
| 24 | 48.3, 30.3 | 53 | o |
| 25 | 15.0 | 7 | x |
| 26 | 20.6 | 20 | Δ |
| 27 | 21.0 | 26 | Δ |
| 28 | 28.1 | 29 | Δ |
| 29 | 30.7 | 53 | o |
| 30 | 31.0 | 49 | o |
| 31 | 31.1 | 35 | o |
| 32 | 31.8 | 19 | x |

TABLE 17

| Sample No. | Transition temperature (°C.) | Latent heat (cal/g) | Evaluation |
|---|---|---|---|
| 33 | 57.9 | 63 | o |
| 34 | 57.7 | 63 | o |
| 35 | 56.8 | 62 | o |
| 36 | 52.3, 21.5 | 61 | o |
| 37 | 50.1, 22.3 | 60 | o |
| 38 | 48.1, 21.9 | 60 | o |
| 39 | 47.1, 22.9 | 59 | o |
| 40 | 43.5, 22.3 | 58 | o |

TABLE 17-continued

| Sample No. | Transition temperature (°C.) | Latent heat (cal/g) | Evaluation |
|---|---|---|---|
| 41 | 40.6, 22.8 | 58 | o |
| 42 | 37.0, 22.4 | 57 | o |
| 43 | 35.7, 22.2 | 56 | o |
| 44 | 32.2, 22.7 | 55 | o |
| 45 | 28.0, 22.2 | 55 | o |
| 46 | 22.3 | 54 | o |
| 47 | 22.1 | 54 | o |
| 48 | 22.0 | 49 | o |
| 49 | 20.2 | 38 | o |
| 50 | 21.3 | 34 | o |
| 51 | 21.2 | 26 | Δ |
| 52 | 21.3 | 18 | x |
| 53 | 22.4 | 14 | x |

TABLE 18

| Sample No. | transition temperature (°C.) | Latent heat (cal/g) | Evaluation |
|---|---|---|---|
| 54 | 37.2 | 10 | x |
| 55 | 40.5 | 20 | Δ |
| 56 | 43.0 | 24 | Δ |
| 57 | 45.1 | 36 | o |
| 58 | 47.3 | 53 | o |
| 59 | 48.3, 22.5 | 58 | o |
| 60 | 48.5, 22.2 | 50 | o |
| 61 | 48.5, 22.3 | 43 | o |
| 62 | 49.1, 22.8 | 28 | Δ |
| 63 | 49.0, 22.4 | 13 | x |
| 64 | 18.6 | 19 | x |
| 65 | 20.3 | 20 | Δ |
| 66 | 20.8 | 28 | Δ |
| 67 | 22.3 | 47 | o |
| 68 | 22.6 | 54 | o |
| 69 | 22.7 | 29 | Δ |
| 70 | 22.6 | 22 | x |
| 71 | 22.1 | 13 | x |

TABLE 19

| Sample No. | Transition temperature (°C.) | Latent heat (cal/g) | Evaluation |
|---|---|---|---|
| 72 | 57.8 | 63 | o |
| 73 | 39.8, 57.0 | 62 | o |
| 74 | 40.0, 55.1 | 62 | o |
| 75 | 39.8, 53.1 | 62 | o |
| 76 | 39.9, 46.2 | 61 | o |
| 77 | 39.9, 42.2 | 61 | o |
| 78 | 40.2 | 61 | o |
| 79 | 40.5 | 61 | o |
| 80 | 40.4 | 53 | o |
| 81 | 39.5 | 46 | o |
| 82 | 37.3 | 34 | o |
| 83 | 35.2 | 29 | Δ |
| 84 | 33.3 | 24 | Δ |
| 85 | 31.2 | 18 | x |
| 86 | 27.2 | 14 | x |

TABLE 20

| Sample No. | Transition temperature (°C.) | Latent heat (cal/g) | Evaluation |
|---|---|---|---|
| 87 | 39.1 | 7 | x |
| 88 | 43.7 | 15 | x |
| 89 | 45.2 | 27 | Δ |
| 90 | 37.5, 46.3 | 43 | o |
| 91 | 39.9, 46.9 | 62 | o |
| 92 | 39.8, 47.0 | 55 | o |
| 93 | 40.1, 47.2 | 39 | o |
| 94 | 40.1, 48.0 | 26 | Δ |
| 95 | 40.0, 48.0 | 14 | x |
| 96 | 29.8 | 10 | x |
| 97 | 32.3 | 16 | x |
| 98 | 35.1 | 24 | Δ |
| 99 | 37.2 | 36 | o |
| 100 | 40.5 | 47 | o |
| 101 | 40.3 | 48 | o |
| 102 | 40.6 | 36 | o |
| 103 | 40.5 | 24 | Δ |
| 104 | 40.7 | 13 | x |

TABLE 21

| Sample No. | Transition temperature (°C.) | Latent heat (cal/g) | Evaluation |
|---|---|---|---|
| 105 | 57.9 | 63 | o |
| 106 | 57.7 | 62 | o |
| 107 | 56.7, 45.0 | 62 | o |
| 108 | 54.7, 45.7 | 61 | o |
| 109 | 52.3, 47.0 | 60 | o |
| 110 | 51.0, 47.5 | 59 | o |
| 111 | 49.0, 48.5 | 58 | o |
| 112 | 48.0 | 57 | o |
| 113 | 46.9 | 56 | o |
| 114 | 45.0 | 43 | o |
| 115 | 44.2 | 28 | Δ |
| 116 | 44.0 | 19 | x |

TABLE 22

| Sample No. | Transition temperature (°C.) | Latent heat (cal/g) | Evaluation |
|---|---|---|---|
| 117 | 39.0, 48.9 | 17 | x |
| 118 | 40.0, 50.3 | 25 | Δ |
| 119 | 42.0, 52.2 | 37 | o |
| 120 | 45.0, 54.3 | 55 | o |
| 121 | 47.0, 55.0 | 60 | o |
| 122 | 47.0, 55.3 | 45 | o |
| 123 | 47.2, 56.0 | 35 | o |
| 124 | 48.5, 56.1 | 18 | x |
| 125 | 48.3 | 56 | o |
| 126 | 45.2 | 48 | o |
| 127 | 37.8 | 18 | x |
| 128 | 39.3 | 29 | Δ |
| 129 | 42.4 | 35 | o |
| 130 | 43.7 | 46 | o |
| 131 | 45.0 | 48 | o |
| 132 | 45.3 | 40 | o |
| 133 | 46.0 | 37 | o |
| 134 | 46.2 | 19 | x |

TABLE 23

| Sample No. | Transition temperature (°C.) | Latent heat (cal/g) | Evaluation |
|---|---|---|---|
| 135 | 58.0 | 63 | o |
| 136 | 57.8 | 63 | o |
| 137 | 57.0, 53.2 | 61 | o |
| 138 | 56.0, 53.2 | 60 | o |
| 139 | 53.8, 53.0 | 59 | o |
| 140 | 53.2 | 57 | o |
| 141 | 53.0 | 54 | o |
| 142 | 52.9 | 46 | o |
| 143 | 52.8 | 34 | o |
| 144 | 52.7 | 29 | Δ |
| 145 | 52.6 | 22 | Δ |
| 146 | 52.6 | 18 | x |

TABLE 24

| Sample No. | Transition temperature (°C.) | Latent heat (cal/g) | Evaluation |
|---|---|---|---|
| 147 | 41.2 | 15 | x |
| 148 | 44.3 | 23 | Δ |
| 149 | 48.3 | 31 | o |
| 150 | 51.2 | 40 | o |
| 151 | 53.9 | 55 | o |
| 152 | 56.2, 53.2 | 58 | o |
| 153 | 57.0, 53.4 | 50 | o |
| 154 | 58.2, 53.4 | 37 | o | content, that is, greater in $CH_3CO_2Na$ content than the compositions comprising $CH_3CO_2Na.3H_2O$ and $CO(NH_2)_2$ as both end components. Thus, when the content of $CH_3CO_2Na$ is increased gradually, without changing the $CO(NH_2)_2$ content, from Sample 13 thenceupwards, that is, when the composition is varied from Sample 13 to Sample 14, then to Sample 15 and likewise successively, the latent heat increases accordingly with a corresponding rise of transition temperature, the latent heat reaching the maximum in Sample 17 having a composition which is most approximate to the composition comprising $CH_3CO_2Na.3H_2O$ and $CO(NH_2)_2$ as both end components. Further increase of the $CH_3CO_2Na$ content does not lead to any additional elevation of latent heat but rather causes a reduction thereof. On the other hand, transition temperature goes on rising with increase of the $CH_3CO_2Na$ content without reaching the maximum along the way upwards.

Such relation is seen among the samples containing 40% of $CO(NH_2)_2$ such as Samples 25–32, and Sample 29 having a composition closest to the composition comprising $CH_3CO_2Na.3H_2O$ and $CO(NH_2)_2$ as both end components, with the transition point being seen rising with the increase of the $CH_3CO_2Na$ content.

Thus, it is found that as compared with the compositions comprising $CH_3CO_2Na\ 3H_2O$ and $CO(NH_2)_2$ as both end components, the compositions which are greater in $H_2O$, that is, less in $CH_3CO_2Na$ are lowered in transition temperature while the compositions which are less in $H_2O$, that is, greater in $CH_3CO_2Na$ are elevated in transition temperature. On the other hand, latent heat decreases if the composition is either greater or less in $H_2O$ content than the compositions having $CH_3CO_2Na.3H_2O$ and $CO(NH_2)_2$ as both end components.

Summarizing the foregoing results, it can be concluded that, in the $CH_3CO_2Na$-$CO(NH_2)_2$-$H_2O$ three-component system, the compositions of the samples marked with a symbol of Δ or o in the Evaluation in Tables 15 and 16, that is, the compositions containing $CH_3CO_2Na$ in the range of 20 to 70% by weight, $CO(NH_2)_2$ in the range below 65% by weight (exclusive of 0%) and $H_2O$ in the range of 15 to 50% by weight are preferred. Most preferred are the compositions comprising $CH_3CO_2Na.3H_2O$ and $CO(NH_2)_2$ as both end components and also containing $CO(NH_2)_2$ in the range not greater than 50% by weight (exclusive of 0%).

Here, the mode of change in the compositions that takes place in heating and cooling is described by taking Sample 5 as an example. First, the composition of Sample 5 containing 80% by weight of $CH_3CO_2Na_2.3H_2O$ and 20% by weight of $CO(NH_2)_2$ is heated over 50° C. and uniformly melted, followed by gradual cooling. Upon reaching a temperature around 45° C., the crystals of $CH_3CO_2Na.3H_2O$ begin to separate out unless no supercooling occurs. This is naturally attended by dissipation of latent heat. $CH_3CO_2Na.3H_2O$ crystal separation is promoted with further continuance of cooling. Upon cooling down to around 30° C., there takes place crystal precipitation of $CO(NH_2)_2$ along with $CH_3CO_2Na.3H_2O$ unless no supercooling occurs. The sample is maintained at the eutectic temperature of about 30° C. until the sample is solidified in its entirety. If this sample is heated from a temperature below the eutectic point, there first takes place melting of the eutectic portion and, with further heating, the remaining crystals of $CH_3CO_2Na.3H_2O$ are gradually melted down, and when the heating temperature reaches 45° C., any of the $CH_3CO_2Na.3H_2O$ crystals disappears and a uniform solution is formed.

Looking into the data given in Table 17, it is noted that in the $CH_3CO_2Na$-$CH_3CONH_2$-$H_2O$ three-component system with $CH_3CO_2Na.3H_2O$ and $CH_3CONH_2$ constituting both end components, Sample 33 containing 0.25% by weight of $CH_3CONH_2$ has its transition point lowered to 57.9° C. but keeps the same value of latent heat as that of $CH_3CO_2Na.3H_2O$ (63 cal/g). When the content of $CH_3CONH_2$ is increased, the transition point accordingly decreases bit by bit, entailing a corresponding reduction of latent heat. The samples with a $CH_3CONH_2$ content above 5% by weight present a different pattern of heat absorption from the conventional one at around 22° C. The transition point on the high temperature side decreases as the content of $CH_3CONH_2$ increases, but the transition point on the low temperature side remains substantially constant at 22° C. In the samples containing more than 55% by weight of $CH_3CONH_2$, both the transition point on the low temperature side and that on the high temperature side are seen overlapping each other. It is also noted that latent heat on the high temperature side lessens while that on the low temperature side elevates as the $CH_3CONH_2$ content increases.

It is found that the compositions comprising $CH_3CO_2Na.3H_2O$ and $CH_3CONH_2$ as both end components and containing $CH_3CONH_2$ in an amount of 55 to 65% by weight like Samples 46, 47 and 48 have a transition point around 22° C. and also show a high latent heat of more than 40 cal/g, indicating their availability as very excellent heat accumulative material. However, the samples with a greater $CH_3CONH_2$ content are greatly lessened in latent heat.

Thus, it is noted that the $CH_3CO_2Na$-$CH_3CONH_2$-$H_2O$ three-component system compositions having $CH_3CO_2Na.3H_2O$ and $CH_3CONH_2$ as both end components and containing $CH_3CONH_2$ in a range greater than 0% but not greater than 75% by weight can be controlled in both heat accumulating and heat releasing temperatures by varying their component contents and yet have as high latent heat as over 30 cal/g, and thus they prove to be a very excellent heat accumulative material not available in the past.

Let us then examine the properties of the samples shown in Table 18 having the compositions in the circumjacent regions of the compositions of Table 17. Samples 54 to 63 are same in $CH_3CONH_2$ content (15% by weight) but varied in contents of $CH_3CO_2Na$ and $H_2O$. Among them, Samples 54 to 58 are the ones which are more in $H_2O$, that is, less in $CH_3CO_2Na$ than the compositions of Table 17 comprising $CH_3CO_2Na.3H_2O$ and $CH_3CONH_2$ as both end components, and Samples 59 to 63 are the ones which are less in $H_2O$, that is, more in $CH_3CO_2Na$ than said compositions. As seen from Table 18, when the content of $CH_3CO_2Na$ is increased successively, without changing the $CH_3CONH_2$ content, from Sample 54 which is least in $H_2O$, that is, when the composition is changed successively from Sample 55 to Sample 56, then to Sample 57 and likewise in succession, latent heat increases, accordingly attended by a rise in transition temperature. Latent heat is maximized in Sample 59 which is most approximate to the corresponding composition of Table 17 comprising $CH_3CO_2Na.3H_2O$ and $CH_3CONH_2$ as both end components. But, any additional increase of $CH_3CO_2Na$ content merely results in a reduction of latent heat. Transition temperature, however, goes on rising with increase of $CH_3CO_2Na$ content without reaching a maximum on the way. A similar relation is seen among the samples containing 60% by weight of $CH_3CONH_2$ such as Samples 64 to 71, and in this case, latent heat is maximized in Sample 68 which is closest to the composition comprising $CH_3CO_2Na.3H_2O$ and $CH_3CONH_2$ at both ends. Transition point goes on rising with increase of $CH_3CO_2Na$ content.

Thus, it is found that as compared with the compositions having $CH_3CO_2Na.3H_2O$ and $CH_3CONH_2$ as both end components, the compositions which are more in $H_2O$ are lowered in transition temperature while the compositions which are less in $H_2O$ are slightly elevated in transition temperature, and latent heat is reduced in the compositions which are either more of less in $H_2O$ as compared with said compositions having $CH_3CO_2Na.3H_2O$ and $CH_3CONH_2$ as both end components.

Summing up the foregoing results, it is learned that in the $CH_3CO_2Na$-$CH_3CONH_2$-$H_2O$ three-component system, the compositions of the samples marked with a symbol of $\Delta$ or o in the Evaluation in Tables 17 and 18, that is, the compositions containing $CH_3CO_2Na$ in the range of 10-70% by weight, $CH_3CONH_2$ in the range below 80% by weight (exclusive of 0%) and $H_2O$ in the range of 10-50% by weight are preferred for use as heat accumulative material, and those comprising $CH_3CO_2Na.3H_2O$ and $CH_3CONH_2$ as both end components and containing $CH_3CONH_2$ in an amount below 75% by weight (exclusive of 0%) are most preferred.

The mode of change in the compositions on heating and cooling thereof is described by taking Sample 40 as an example. The composition comprising 75% by weight $CH_3CO_2Na.3H_2O$ and 25% by weight $CH_3CONH_2$ is melted by heating it over 50° C. and then gradually cooled. Upon reaching around 43° C., the crystals of $CH_3CO_2Na.3H_2O$ begin to separate out unless no supercooling occurs. Further cooling increases the crystals of $CH_3CO_2Na.B\ 3H_2O$, and when the melt is cooled down to about 22° C., another component is precipitated as eutectic crystals with $CH_3CO_2Na\ 2H_2O$ unless no supercooling occurs. During this operation, the sample is maintained at the eutectic temperature of about 22° C. In case the sample is heated, the eutectic portion is first melted down, followed by gradual melting of the crystals of $CH_3CO_2Na.3H_2O$, and when the heating temperature reaches 44° C., the crystals of $CH_3CO_2Na.3H_2O$ disappear.

Now, the data of Table 19 are analyzed. In the $CH_3CO_2Na$-$HCONH_2$-$H_2O$ three-component system having the end components constituted by $CH_3CO_2Na.3H_2O$ and $HCONH_2$, Sample 72 containing 0.2% by weight of $HCONH_2$ is lowered in transition temperature down to 57.8° C. but maintains the same level of latent heat as $CH_3CO_2Na.3H_2O$ (63 cal/g). When the $HCONH_2$ content is increased, there presents itself a new transition at around 40° C. from Sample 73 containing 1.0% by weight of $HCONH_2$. The high-temperature transition lowers with increase of $HCONH_2$ while the transition around 40° C. is scarcely changed and maintains its temperature. In Sample 78 with more than 20% by weight of $HCONH_2$, both high-temperature transition and low-temperature transition are observed overlapping each other, and in the samples having a $HCONH_2$ content of up to 30% by weight (Samples 72 to 80), the transition temperature is maintained substantially at 40° C. In the samples having a $HCONH_2$ content of 35% by weight or higher (from Sample 81 upwards), the transition temperature lowers gradually, it reaching 15.9° C. in Sample 86 of which the $HCONH_2$ content is 60% by weight.

Latent heat is kept constant, about 61 cal/g in the samples till Sample 75 in which the $HCONH_2$ content is 25%. When considering the fact that the melting point of $CH_3CO_2Na.3H_2O$ is 58° C. and that of $HCONH_2$ is 2° C., said high latent heat (61 cal/g) of Sample 78 may be explained as follows: In the $CH_3CO_2Na.3H_2O$-$HCONH_2$ mixed system, there exists a certain addition compound composed of $CH_3CO_2Na$, $3H_2O$ and $HCONH_2$ and this gives rise to a new transition at 40° C. which is a temperature intermediate the melting point (58° C.) of $CH_3CO_2Na.3H_2O$ and that (2° C.) of $HCONH_2$.

From Sample 80 where the $HCONH_2$ content is 30% by weight, latent heat is lowered gradually, reaching 14 cal/g in Sample 86 which contains 60% by weight of $HCONH_2$.

It is thus found that the $CH_3CO_2Na$-$HCONH_2$-$H_2O$ three-component system compositions having $CH_3CO_2Na.3H_2O$ and $HCONH_2$ as both end components and containing $HCONH_2$ in the range below 40% by weight (exclusive of 0%) can be controlled in both heat accumulating and heat releasing temperatures by varying the component ratios and also have latent heat higher than 30 cal/g, and thus these compositions can serve as a very excellent heat accumulative material never seen in the past.

Now, the properties of the samples shown in Table 20 which are in the perimeter of the above-described compositions comprising $CH_3CO_2Na.3H_2O$ and $HCONH_2$ as both end components. Samples 87 to 95 have the same content of $HCONH_2$ (10% by weight) and are varied in contents of $CH_3CO_2Na$ and $H_2O$. Also Samples 96 to 104 have the same content of $HCONH_2$ (30% by weight) and are varied in contents of $CH_3CO_2Na$ and $H_2O$.

Samples 87 to 90 and Samples 96 to 100 are of the compositions which are more in $H_2O$, that is, less in $CH_3CO_2Na$ than the above-said compositions comprising $CH_3CO_2Na.3H_2O$ and $HCONH_2$, and Samples 91 to 95 and Samples 101 to 104 are of the compositions which are less in $H_2O$, that is, more in $CH_3CO_2Na$ than the above-said compositions.

Thus, in Samples 87 to 95 with 10% by weight of $HCONH_2$ content, when the content of $CH_3CO_2Na$ is increased from Sample 87 which is greatest in $H_2O$ content, that is, when the composition is varied from Specimen 87 to 88, then to 89 and likewise in succession, latent heat increases accordingly with a corresponding rise of transition temperature, and two transitions make their appearance from Sample 90 which is close to the described compositions having $CH_3CO_2Na.3H_2O$ and $HCONH_2$ as both end components. Any further increase of $CH_3CO_2Na$, however, rather causes a decrease of latent heat. Transition temperature rises up with increase of the $CH_3CO_2Na$ content without showing a maximum on the way. Such relation is also seen in Samples 96 to 104 containing 30% by weight of $HCONH_2$, with latent heat being maximized in Sample 101 which is most approximate to the said composition comprising $CH_3CO_2Na.3H_2O$ and $HCONH_2$ as both end components. Transition temperature is seen rising up in accordance with increase of $CH_3CO_2Na$ content.

Thus, it is found that the sample which are more in $H_2O$, that is, less in $CH_3CO_2Na$ in comparison with the compositions having $CH_3CO_2Na.3H_2O$ and $HCONH_2$ as both end components are lowered in transition temperature while the samples less in $H_2O$, that is, more in $CH_3CO_2Na$ are elevated in transition temperature. Latent heat decreases in the samples which are either more or less in $H_2O$, that is, less or more in $CH_3CO_2Na$ than the compositions having $CH_3CO_2Na.3H_2O$ and $HCONH_2$ as both end components.

Summarizing the foregoing results, it is concluded that in the $CH_3CO_2Na$-$HCONH_2$-$H_2O$ three-component system, the compositions of the samples marked with a symbol of Δ or o in the Evaluation in Tables 19 and 20, that is, the compositions with a $CH_3CO_2Na$ content in the range of 30 to 70% by weight, a $HCONH_2$ content of not greater than 50% by weight (exclusive of 0%) and a $H_2O$ content within the range of 15 to 45% by weight are preferred for use as heat accumulative material, and the compositions comprising $CH_3CO_2Na.3H_2O$ and $HCONH_2$ as both end components with a $HCONH_2$ content of not greater than 40% by weight (exclusive of 0%) are most preferred.

Discussing now the data given in Table 21, it is seen that in the $CH_3CO_2Na$-$NH_2CH_2CO_2H$-$H_2O$ three-component system with $CH_3CO_2Na.3H_2O$ and $NH_2CH_2CO_2H$ constituting both end components, Sample 105 containing 0.2% by weight of $NH_2CH_2CO_2H$ undergoes a reduction in transition point down to 57.9° C. but maintains the same level of latent heat as that of $CH_3CO_2Na.3H_2O$ (63 cal/g). Increase of the $NH_2CH_2CO_2H$ content entails a corresponding bit-by-bit lowering of transition point, attended by a slight reduction of latent heat. In the samples having a $NH_2CH_2CO_2H$ content above 2% by weight, there is observed a different transition from that seen in the conventional compositions. As the $NH_2CH_2CO_2H$ content increases, the high temperature side transition point lowers but the low temperature side transition point remains substantially unchanged. In the samples containing more than 15% by weight of $NH_2CH_2CO_2H$, the low temperature side transition is seen substantially overlapping with the high temperature side transition. It is thus found that the compositions comprising $CH_3CO_2Na.3H_2O$ and $NH_2CH_2CO_2H$ as both end components and containing about 15 to 30% by weight of $NH_2CH_2CO_2H$, such as Samples 112, 113 and 114, can be an excellent heat accumulative material as they have the transition point around 45° C. and also possess as high latent heat as over 40 cal/g. In the samples containing a greater amount of $NH_2CH_2CO_2H$, the transition point is slightly lowered and also latent heat is greatly reduced.

From the foregoing, it is understood that the $CH_3CO_2Na$-$NH_2CH_2$-$CO_2H$-$H_2O$ three-component system compositions having $CH_3CO_2Na.3H_2O$ and $NH_2CH_2CO_2H$ as both end components and containing $NH_2CH_2CO_2H$ in an amount not greater than 30% by weight (exclusive of 0%) can be controlled in both heat accumulating and heat releasing temperatures by varying their component ratios and also have latent heat of over 30 cal/g, and therefore they can serve as a very excellent heat accumulative material not available in the past.

Let us then examine the properties of the samples shown in Table 22 which are in the neighboring regions of the above-described compositions comprising $CH_3CO_2Na.3H_2O$ and $NH_2CH_2CO_2H$ as both end components. Samples 117 to 124 are same in content of $NH_2CH_2CO_2H$ (5% by weight) and varied in contents of $CH_2CO_2Na$ and $H_2O$. Of these samples, Samples 117 to 120 are the ones having the compositions which are more in $H_2O$, that is, less in $CH_3CO_2Na$ than the above-said compositions comprising $CH_3CO_2Na.3H_2O$ and $NH_2CH_2CO_2N$ as both end components, while Samples 121 to 124 are the ones having the compositions which are less in $H_2O$, that is, more in $CH_3CO_2Na$ than the compositions comprising $CH_3CO_2Na.3H_2O$ and $NH_2CH_2CO_2H$ as both end components. Thus, when the content of $CH_3CO_2Na$ is increased, without changing the content of $NH_2CH_2CO_2H$, from Sample 117 which is excess in $H_2O$, that is, when the composition is varied from Samples 117 to 118, then to 119 and likewise in succession, there takes place an increase of latent heat accompanying therewith a rise of transition temperature.

Latent heat is maximized in Sample 108 of Table 21 having a composition comprising $CH_3CO_2Na.3H_2O$ and $NH_2CH_2CO_2H$ as both end component and containing 5% by weight of $NH_2CH_2CO_3H$, and as noted from the properties of Samples 122, 123 and 124, any further increment of the content of $CH_3CO_2Na$ brings about no additional increase of latent heat but rather causes a reduction thereof. Transition temperature rises up with increase of the content of $CH_3CO_2Na$ without showing a maximum on the way. The same relation is admitted among the samples containing 25% by weight of $NH_2CH_2CO_2H$; it is seen that the greatest latent heat is possessed by Sample 131 which is closest to the compositions having $CH_3CO_2Na.3H_2O$ and $NH_2CH_2CO_2H$ at both ends, and the transition point goes on rising with increase of the $CH_3CO_2Na$ content.

Thus, it is found that the transition point is lowered in the compositions which are more in $H_2O$, that is, less in $CH_3CO_2Na$ than the compositions comprising $CH_3CO_2Na.3H_2O$ and $NH_2CH_2CO_2H$ as both end components, while the transition point slightly elevates in the compositions which are less in $H_2O$, that is, more in $CH_3CO_2Na$. Latent heat is reduced in the compositions which are either more or less in $H_2O$, that is, either less or more in $CH_3CO_2Na$ than the compositions comprising $CH_3CO_2Na.3H_2O$ and $NH_2CH_2CO_2H$ as both end components.

The foregoing results come to the following conclusion: In this $CH_3CO_2Na$-$NH_2CH_2CO_2H$-$H_2O$ three-component system, the compositions of the samples marked with a symbol of Δ or o in the Evaluation in Tables 21 and 22, that is, the compositions with a $CH_3CO_2Na$ content in the range of 30–70% by weight, a $NH_2CH_2CO_2H$ content in the range below 40% by weight (exclusive of 0%) and a $H_2O$ content in the range of 20–50% by weight are preferred, and the compositions comprising $CH_3CO_2Na.3H_2O$ and $NH_2CH_2CO_2H$ as both end components and also containing not greater than 30% of $NH_2CH_2CO_2H$ (exclusive of 0%) are most preferred.

Here, the mode of change in the compositions at the time of heating and cooling is described by citing Sample 108 for instance. First, the composition comprising 95% by weight of $CH_3CO_2Na.3H_2O$ and 5% by weight of $NH_2CH_2CO_2H$ is heated over 60° C. and melted, followed by gradually cooling. Upon reaching about 55° C., the crystals of $CH_3CO_2Na.3H_2O$ begin to separate out unless no supercooling occurs. Further cooling increases the crystals of $CH_3CO_2Na.3H_2O$, and when the melt is cooled down to around 46° C., another component separates out as a eutectic mixture with $CH_3CO_2Na.3H_2O$ unless no supercooling occurs. During this time, the sample is maintained at the eutectic temperature of about 46° C. In the case of heating, the eutectic portion is first melted, followed by gradual melting of the crystals of $CH_3CO_2Na.3H_2O$ which crystals completely disappear upon being heated to 55° C.

Analyzing the data in Table 23, it is seen that in the $CH_3CO_2Na$-$CH_3(NH_2)CHCO_2H$-$H_2O$ three-component system having its ends constituted by $CH_3CO_2Na.3H_2O$ and $CH_3(NH_2)CHCO_2H$, Sample 135 containing 0.25% by weight of $CH_3(NH_2)CHCO_2H$ has its transition point lowered to 58.0° C. but maintains the same level of latent heat as $CH_3CO_2Na.3H_2O$ (63 cal/g). When the content of $CH_3(NH_2)CHCO_2H$ is increased, another transition comes out at around 53° C. in the samples containing more than 2% by weight of $CH_3(NH_2)CHCO_2H$. As the content of $CH_3(NH_2)CHCO_2H$ keeps increasing, the high temperature side transition point lowers while the low temperature side transition point remains substantially constant. In the samples containing more than 10% by weight of $CH_3(NH_2)CHCO_2H$, both low temperature side and high temperature side transitions are seen overlapping each other. It is thus found that the compositions comprising $CH_3CO_2Na.3H_2O$ and $CH_3(NH_2)CHCO_2H$ as both end components with a $CH_3(NH_2)CHCO_2H$ content of 10-20% by weight prove to be an excellent heat accumulative material having a transition point around 53° C. and a latent heat buildup of over 40 cal/g. In the sample containing more than 20% by weight of $CH_3(NH_2)CHCO_2H$, although there takes place almost no change of transition point latent heat decreases.

Thus, the fact is learned that the $CH_3CO_2Na$-$CH_3(NH_2)CHCO_2H$-$H_2O$ three-component system compositions having its both end components constituted by $CH_3CO_2Na.3H_2O$ and $CH_3(NH_2)CHCO_2H$ and also containing $CH_3(NH_2)CHCO_2H$ in an amount not greater than 25% by weight (excluding 0%) can be controlled in both heat accumulating temperature and heat releasing temperature by varying their component proportions and also have a high latent heat potential of over 30 cal/g, and thus they can serve as a very excellent heat accumulative material unrivalled by any conventional products.

An analysis is now made on the properties of the samples shown in Table 24 which are in the circumjacent regions of the said compositions comprising $CH_3CO_2Na.3H_2O$ and $CH_3(NH_2)CHCO_2H$ as both end components. Samples 147 to 155 are kept same in content of $CH_3(NH_2)$-$CHCO_2H$ (5% by weight) and varied in contents of $CH_3CO_2Na$ and $H_2O$. Among them, Samples 147-151 are of the compositions which are more in $H_2O$, that is, less in $CH_3CO_2Na$ than the said compositions comprising $CH_3CO_2Na.3H_2O$ and $CH_3(NH_2)CHCO_2H$ as both end components, and Samples 152-155 are of the compositions which are less in $H_2O$, that is, more in $CH_3CO_2Na$ than the said compositions comprising $CH_3CO_2Na.3H_2O$ and $CH_3(NH_2)CHCO_2H$. Thus, when the content of $CH_3CO_2Na$ is increased, by keeping the content of $CH_3(NH_2)CHCO_2H$ same at 5% by weight, from Sample 147 with excess $H_2O$, that is, when the composition is varied from Sample 147 to 148, then to 149 and likewise in succetion, latent heat is seen increasing with a corresponding rise of transition temperature. Latent heat is maximized in Sample 138 of Table 23 having $CH_3CO_2Na.3H_2O$ and $CH_3(NH_2)CHCO_2H$ as both end components, and any increment of the content of $CH_3CO_2Na$ brings about no additional increase of latent heat but rather causes a reduction thereof. On the other hand, transition temperature is seen rising steadily in accordance with increase of $CH_3CO_2Na$ without reaching a maximum on the way. Samples 147-151 having excess $H_2O$ do not present two transitions but present only one transition.

Such relation is also seen among the samples containing 15% by weight of $CH_3(NH_2)CHCO_2H$, that is, Sample 141 in Table 23 and Samples 156-164 in Table 24. Of these samples, Sample 141 of Table 23 comprising $CH_3CO_2Na.3H_2O$ and $CH_3(NH_2)CHCO_2H$ as both end components has the greatest latent heat, and the transition temperature rises up proportionally to the increase of $CH_3CO_2Na$.

It is thus found that the samples which are more in $H_2O$, that is, less in $CH_3CO_2Na$ than the said compositions comprising $CH_3CO_2Na.3H_2O$ and $CH_3(NH_2)CHCO_2H$ as both end components are lowered in transition temperature while the samples which are less in $H_2O$, that is, more in $CH_3CO_2Na$ than the said compositions are slightly elevated in transition temperature, and latent heat is reduced in the samples which are either more or less in $H_2O$, that is, either less or more in $CH_3CO_2Na$ than the said compositions.

Reviewing the foregoing results, it is concluded that in the $CH_3CO_2Na$-$CH_3(NH_2)CHCO_2H$-$H_2O$ three-component system, the compositions of the samples marked with a symbol of Δ or o in the Evaluation in Tables 23 and 24, that is, the compositions containing 35-70% by weight of $CH_3CO_2Na$, not greater than 35% by weight of $CH_3(NH_2)CHCO_2H$ (exclusive of 0%) and 20-55% by weight of $H_2O$ are desirable, and the compositions comprising $CH_3CO_2Na.3H_2O$ and $CH_3(NH_2)CHCO_2H$ as both end components and also containing not greater than 25% by weight of $CH_3(NH_2)CHCO_2H$ (exclusive of 0%) are most desirable.

The mode of change on heating and cooling is discussed by taking Sample 138 as an example. First, the composition containing 95% by weight of $CH_3CO_2Na.3H_2O$ and 5% by weight of $CH_3(NH_2)CHCO_2H$ is heated over 60° C. and melted, followed by gradual cooling. Upon reaching about 56° C., the crystals of $CH_3CO_2Na.3H_2O$ begin to separate out unless no supercooling occurs. The crystals of $CH_3CO_2Na.3H_2O$ increase as cooling is continued, and when the melt is cooled down to about 53° C., another component begins to separate out as an eutectic mixture with $CH_3CO_2Na.3H_2O$ unless no supercooling occurs. During this period, the sample is maintained at the eutectic temperature of about 53° C. When the composition is heated, the eutectic portion is first melted, followed by gradual melting of the crystals of $CH_3CO_2Na.3H_2O$ until such crystals completely disappear upon heated to 56° C.

Figure 2:
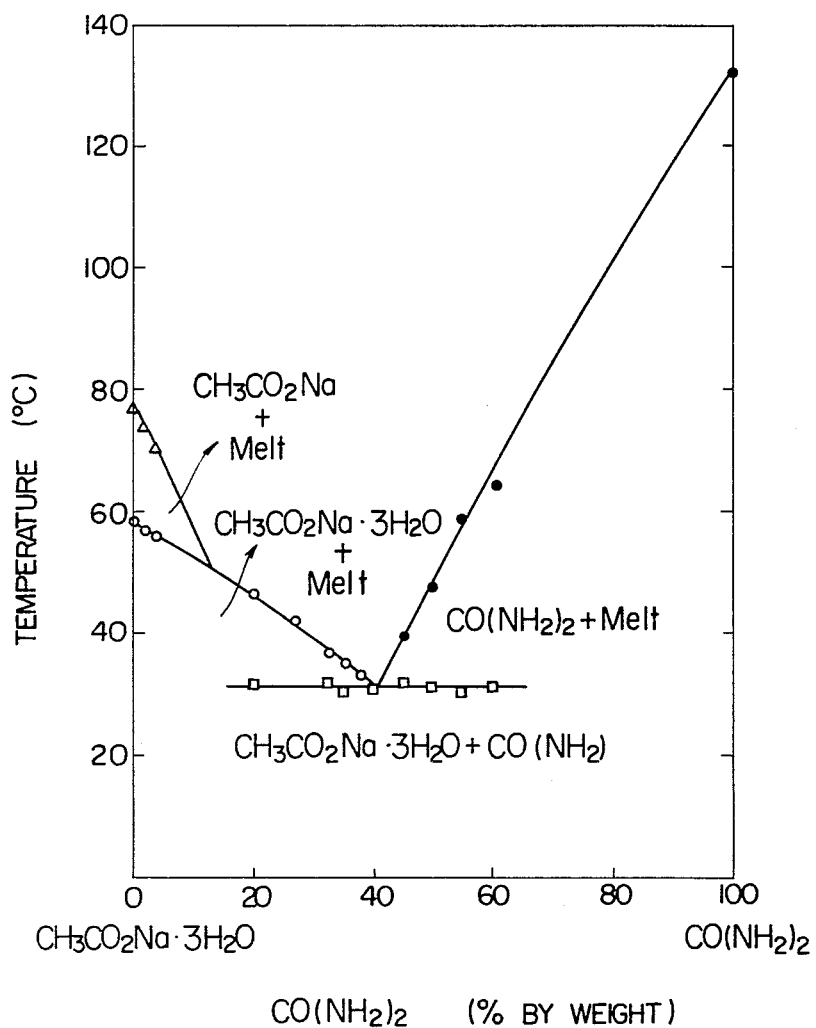
FIG. 2 is a phase diagram of a composition of this invention comprising $CH_3CO_2Na.3H_2O$ and $CO(NH_2)_2$.

Described hereinabove are the analytical results on the samples having the compositions of the $CH_3CO_2Na$-$H_2O$ system added with at least one compound selected from the group consisting of $CO(NH_2)_2$, $CH_3CONH_2$, $HCONH_2$, $NH_2CH_2CO_2H$ and $CH_3(NH_2)CHCO_2H$, and particularly detailed discussions were made on the samples of the compositions in which $CH_3CO_2Na.3H_2O$ and one of the above-shown compounds constitute both end components. FIG. 2 shows the phase diagram of a system having as its both end components $CH_3CO_2Na.3H_2O$ and $CO(NH_2)_2$. It is seen from this diagram that the compositions containing 60% by weight of $CH_3CO_2Na.3H_2O$ and 40% by weight of $CO(NH_2)_2$ are capable of forming a eutectic mixture and have a eutectic point of 30° C. It can be also learned from the tables showing the determination results that the systems consisting of $CH_3CO_2Na.3H_2O$ and $CH_3CONH_2$, $NH_2CH_2CO_2H$ and $CH_3(NH_2)CHCO_2H$, respectively, can also form a eutectic mixture as in the case of $CO(NH_2)_2$ and have a eutectic point of 22° C., 46° C. and 53° C., respectively. In the system consisting of $CH_3CO_2Na.3H_2O$ and $HCONH_2$, unlike in the $CH_3CO_2Na.3H_2O$-$CO(NH_2)_2$ system, a certain addition compound is formed between $CH_3CO_2Na.3H_2O$ and $HCONH_2$.

It will now give an analytical consideration to the samples including two types of compounds, that is, $CO(NH_2)_2$ and $NH_2CH_2CO_2H$, added to the $CH_3CO_2Na$-$H_2O$ system. First, the data in Table 25 are discussed. The samples shown in this table are of the compositions whose both end components are constituted by $NH_2CH_2CO_2H$ and a system consisting of 38% by weight of $CH_3CO_2Na$, 37% by weight of $CO(NH_2)_2$ and 25% by weight of $H_2O$, which compositions are very close to the eutectic mixture of $CH_3CO_2Na.3H_2O$ and $CO(NH_2)_2$.

Sample 165 containing 0.2% by weight of $NH_2CH_2CO_2H$ has a transition point of 31.0° C. and a latent heat of 54 cal/g. It is seen that as the $NH_2CH_2CO_2H$ content is increased, the transition point lowers bit by bit, attended by a corresponding reduction, though slight, of latent heat. In the samples with more than 1% by weight of $NH_2CH_2CO_2H$ content, there appears another transition around 25° C. beside the transition around 30° C. As the $NH_2CH_2CO_2H$ content increases, the high temperature side transition lowers down but the low temperature side transition remains at around 25° C. In the samples containing more than 8% by weight of $NH_2CH_2CO_2H$, the low temperature side transition is seen overlapping the high temperature side transition. It is thus noted that the compositions containing 8 to 12% by weight of $NH_2CH_2CO_2H$ has a transition around 25° C. and are also high in latent heat (over 40 cal/g), and thus they can be an excellent latent heat accumulative material. In view of the fact that these samples comprise as both end components $NH_2CH_2CO_2H$ and a composition approximate to the eutectic composition of $CO(NH_2)_2$ and $CH_3CO_2Na.3H_2O$, it appears that the transition at 25° C. is attributable to the eutectoid of the three components of the composition, that is, $CH_3CO_2Na.3H_2O$, $CO(NH_2)_2$ and $NH_2CH_2CO_2H$.

Now, the properties of the samples shown in Table 26 are analyzed. The samples in this table are of the compositions having their both end components constituted from $CO(NH_2)_2$ and a system consisting of 51.3% by weight $CH_3CO_2Na$, 15% by weight $NH_2CH_2CO_2H$ and 33.7% by weight $H_2O$, said compositions being very close to the eutectic of $CH_3CO_2Na.3H_2O$ and $NH_2CH_2CO_2H$. It is seen that Sample 175 containing 0.2% by weight of $CO(NH_2)_2$ has a transition at 47.3° C. and shows latent heat of as high as 56 cal/g. As the $CO(NH_2)_2$ content is increased, the transition point lowers down bit by bit, entailing slight degrees of reduction of latent heat. The samples with more than 4% by weight of $CO(NH_2)_2$ content present a transition around 25° C. separate from the one around 45° C. With increase of the $CO(NH_2)_2$ content, the high temperature side transition lowers down but the low temperature side transition stays around 25° C. In the samples containing more than 30% by weight of $CO(NH_2)_2$, the low temperature side transition is observed overlapping the high temperature side transition. It is thus noted that the smaples with a $CO(NH_2)_2$ content in the range of 30 to 40% by weight have a transition around 25° C. and are also high in latent heat (over 40 cal/g), and thus they have the very desirable properties for use as a latent heat accumulative material.

The transition at 25° C. is considered ascribable to the eutectoid of the three components, $CH_3CO_2Na.3H_2O$, $CO(NH_2)_2$ and $NH_2CH_2CO_2H$, as in the case of the samples in Table 25.

It is understood that the samples in Table 25 have reached a eutectic composition of the $CH_3CO_2Na.3H_2O$-$CO(NH_2)_2$-$NH_2CH_2CO_2H$ three-component system by adding $NH_2CH_2CO_2H$ to a eutectic composition of $CH_3CO_2Na.3H_2O$ and $CO(NH_2)_2$, while the samples in Table 26 have reached a eutectic composition of said three-component system by adding $CO(NH_2)_2$ to a eutectic mixture of $CH_3CO_2Na.3H_2O$ and $NH_2CH_2CO_2H$. Thus, it is considered that these three-component eutectic compositions comprise substantially 57% by weight of $CH_3CO_2Na.3H_2O$, 33% by weight of $CO(NH_2)_2$ and 10% by weight of $NH_2CH_2CO_2H$. In other words, these eutectic compositions contain 34.4% by weight of $CH_3CO_2Na$, 33% by weight of $CO(NH_2)_2$, 10% by weight of $NH_2CH_2CO_2H$ and 22.6% by weight of $H_2O$.

From these facts, it is realized that the samples shown in Table 11 become controllable in melting point between 31° and 25° C. by adding $NH_2CH_2CO_2H$ to a eutectic system of $CH_3CO_2Na.3H_2O$ and $CO(NH_2)_2$ and also come to have as high latent heat as over 30 cal/g, and thus they become a very excellent heat accumulative material unavailable in the past. In the case of the samples shown in Table 12, by adding $CO(NH_2)_2$ to be eutectic system of $CH_3CO_2Na.3H_2O$ and $NH_2CH_2CO_2H$, it becomes possible to control the melting point between 48° and 25° C. and also the latent heat is elevated above 30 cal/g to provide a very excellent heat accumulative material.

The samples in Table 13 are of the compositions which are in the circumabience of the compositions shown in Tables 11 and 12, and the ratio of $CH_3CO_2Na$ to $H_2O$ is kept constant so that the compositional ratio of $CH_3CO_2Na.3H_2O$ is always constant. These compositions may be considered as constituting a $CH_3CO_2Na.3H_2O$-$CO(NH_2)_2$-$NH_2CH_2CO_2H$ three-component system in which the eutectic composition of $CH_3CO_2Na.3H_2O$ and $CO(NH_2)_2$ contains about 37% by weight of $CO(NH_2)_2$, the eutectic composition of $CH_3CO_2Na.3H_2O$ and $NH_2CH_2CO_2H$ contains about 15% by weight of $NH_2CH_2CO_2H$ and the eutectic composition of $CH_3CO_2Na.3H_2O$, $CO(NH_2)_2$ and $NH_2CH_2CO_2H$ contains about 33% by weight of $CO(NH_2)_2$ and about 10% by weight of $NH_2CH_2CO_2H$. In the light of the above and the fact that their eutectic temperature is approximately 30° C., 46° C. and 25° C., respectively, the properties of the respective samples shown in Table 27 may be understood. In the case of Sample 186 containing 5% by weight of $CO(NH_2)_2$, 5% by weight of $NH_2CH_2CO_2H$, 90% by weight of $CH_3CO_2Na.3H_2O$, 54.3% by weight of $CH_3CO_2Na$ and 35.7% by weight of $H_2O$, when this sample is cooled down from its molten state, the crystals of $CH_3CO_2Na.3H_2O$ begin to separate out at around 54° C. if no supercooling occurs, an amount of such crystals precipitated increases as the temperature lowers down. It is supposed that when cooled down to around 43° C., the solution composition comes on the line connecting the $CH_3CO_2Na.3H_2O$-$NH_2CH_2CO_2H$ eutectic composition and the $CH_3CO_2Na.3H_2O$-$NH_2CH_2CO_2H$-$CO(NH_2)_2$ three-component eutectic composition, and it can be considered that thenceforth this sample follows the same pattern as the samples shown in Table 12, that is, said solution composition approaches the three-component system eutectic composition while separating out $CH_3CO_2Na.3H_2O$ and $NH_2CH_2CO_2H$, and consequently there is left a solution of said three-component system eutectic composition and this solution is solidified to become a solid in its entirety.

Thus, Sample 186 is capable of evolving heat while precipitating the crystals stepwise between 54° C. and 25° C. and is also very high in latent heat (57 cal/g), so that it can serve as a very excellent heat accumulative material unknown in the past. As viewed above, Samples 185 to 203 shown in Table 13 are capable of heat accumulation owing to their latent heat at several stages of temperature corresponding to the respective compositions, and such latent heat is sufficiently high to meet the requirements in use as a heat accumulative material.

Now, the properties of the samples shown in Table 28 are analyzed. In these samples, the content of $NH_2CH_2CO_2H$ is kept constant at 1% by weight and the contents of $CH_3CO_2Na$, $CO(NH_2)_2$ and $H_2O$ are varied. From the shown properties of these samples, it can be learned that latent heat becomes highest in Sample 209 in which the $CH_3CO_2Na$ to $H_2O$ ratio by weight is closest to 60 to 40 at which $CH_3CO_2Na.3H_2O$ is formed, and as the composition is varied therefrom to Samples 208, 207, 206, ... which are successively higher in $H_2O$ content than the $CH_3CO_2Na.3H_2O$ ratio-fixed composition, latent heat decreases gradually along with lowering of transition temperature. It is also noted that latent heat decereases as the composition is varied to Samples 210, 211, 212, ... which are successively higher in $CH_3CO_2Na$ content that the composition with the fixed $CH_3CO_2Na.3H_2O$ ratio. In this case, however, transition temperature remains substantially unchanged. Such relation is also seen in Samples 214–221 where the contents of $NH_2CH_2CO_2H$ and $CO(NH_2)_2$ are kept constant at 1% and 39% by weight, respectively, and the contents of $CH_3CO_2Na$ and $H_2O$ are varied. In these samples, latent heat is highest in Sample 218 in which the $CH_3CO_2Na$ to $H_2O$ ratio is closest to that of the composition with fixed $CH_3CO_2Na.3H_2O$ ratio.

It is thus found that in case the contents of $CO(NH_2)_2$ and $NH_2CH_2CO_2H$ are kept constant, latent heat becomes highest when the $CH_3CO_2Na$ to $H_2O$ ratio is equal to that of the composition with the fixed $CH_3CO_2Na.3H_2O$ ratio, and latent heat decreases if the composition is higher in either $H_2O$ or $CH_3CO_2Na$ content than said fixed-ratio composition. On the other hand, transition temperature lowers greatly in the compositions in which the $CH_3CO_2Na$ to $H_2O$ ratio is lower than the composition of fixed $CH_3CO_2Na.3H_2O$, but it remains substantially unchanged when said ratio is higher than said $CH_3CO_2Na.3H_2O$ composition.

Summarizing the foregoing results, it may be concluded that in the $CH_3CO_2Na$-$CO(NH_2)_2$-$NH_2CH_2CO_2H$-$H_2O$ four-component system, the compositions of the samples marked with a symbol of Δ or o in Tables 25–28, that is, the compositions having a $CH_3CO_2Na$ content in the range not less than 20% by weight and not greater than 70% by weight, a $CO(NH_2)_2$ content in the range not less than 0% by weight and not greater than 65% by weight (exclusive of 0%), an $NH_2CH_2CO_2H$ content in the range not less than 0% by weight and not greater than 30% by weight (exclusive of 0%) and a $H_2O$ content in the range not less than 15% by weight and not greater than 50% by weight are preferred for the purpose of this invention.

As explained above, the compositions of a $CH_3CO_2Na$-$H_2O$ system mixed with at least one compound selected from the group consisting of $CO(NH_2)_2$, $CH_3CONH_2$, $HCONH_2$, $NH_2CH_2CO_2H$ and $CH_3(NH_2)CHCO_2H$ are not only controllable in heat accumulating temperature and heat releasing temperature by varying their component ratios but also have a high heat accumulating capacity with stabilized heat absorbing and evolving performance.

However, since these compositions, once melted, tends to incur supercooling, it is desirable to use some crystal nucleus forming material. As such crystal nucleus forming material, it is recommended to use at least one compound selected from the group consisting of sodium pyrophosphate ($Na_4P_2O_7$), trisodium monohydrogenpyrophosphate ($Na_3HP_2O_7$), disodium dihydrogenpyrophosphate ($Na_2H_2P_2O_7$) and monosodium trihydrogenpyrophosphae ($NaH_3P_2O_7$) which have the effect of preventing supercooling of $CH_3CO_2Na.3H_2O$. $Na_4P_2O_7$ may be in the form of the decahydrate thereof ($Na_4P_2O_7.10H_2O$) and $Na_2H_2P_2O_7$ may be in the form of the hexahydrate thereof ($Na_2H_2P_2O_7.6H_2O$).

$Na_4P_2O_7$, $Na_4P_2O_7.10H_2O$, $Na_3HP_2O_7$, $Na_2H_2P_2O_7$, $Na_2H_2P_2O_7.6H_2O$ and $NaH_3P_2O_7$, when used as a crystal nucleus forming material, can take a well satisfactory supercooling preventive effect by mixing them in an amount of 0.01 part by weight, 0.01 part by weight, 0.1 part by weight, 0.1 part by weight, 0.1 part by weight and 0.5 part by weight, respectively, to 100 parts by weight of the whole composition. In case composition of said $CH_3CO_2Na$-$H_2O$ system added with at least one of the above-cited compounds contains $H_2O$ in large quantities, the amount of the crystal nucleus forming material dissolved increases as compared with the previously described case, so that it is naturally required to add said compound in a greater amount than above-defined.

However, in practical use of the heat accumulating material according to this invention, for example in a heat accumulator for air conditioner, it is considered appropriate to use said material usually in an amount of about 100 to 1,000 kg. In such application, even if the heat accumulative material is in a molten state, the material would not form a uniform composition; a low-concentration solution stays in the upper portion of the heat accumulator tank while a high-concentration solution and the crystal nucleus forming material exist in the lower portion. Therefore, even if the amount of the crystal nucleus forming material actually mixed is substantially less than the minimum amount required when forming a uniform solution, said nucleus forming material would not be dissolved in the melt of the heat accumulative material and can function as a crystal nucleus forming medium. The minimum amount of said crystal nucleus forming material necessary for the crystal nucleus formation, that is, the lower limit of the mixed amount thereof, depends on the component proportions of the $CH_3CO_2Na$-$H_2O$ system composition blended with said compound (or compounds) and the size and configuration of the heat accumulative material container, so that such amount may be suitably decided according to the mode of use.

However, addition of a too large amount of the crystal nucleus forming material is undesirable as it may lead to a decrease of the heat accumulating capacity when the whole heat accumulative material is considered. In practical use, therefore, the mixing ratio of the crystal nucleus forming material is preferably not greater than 40 parts by weight to 100 parts by weight of the whole composition.

The principle of this invention resides in addition of a $CH_3CO_2Na.3H_2O$ crystal nucleus forming material such as $Na_4P_2O_7$, $Na_4P_2O_7.10H_2O$, $Na_3HP_2O_7$, $Na_2H_2P_2O_7$ and $Na_2H_2P_2O_7.6H_2O$ to a system principally composed of a eutectic mixture of $CH_3CO_2Na.3H_2O$ and other component, thereby to effectively prevent supercooling of said system. So, we first discuss the case of a system mainly composed of a eutectic mixture of $CH_3CO_2Na.4H_2O$ and $CO(NH_2)_2$ and mixed with 0.1% by weight of $Na_4P_2O_7.10H_2O$ as the crystal nucleus forming material. When the composition contains 37% of $CO(NH_2)_2$ and is closely analogous to a eutectic composition, the melting point (eutectic point) of such composition is around 30° C., so that when such composition is heated to around 40° C., it is melted. When the melt is again cooled after maintaining it as it was for a given period of time, supercooling gives way a around 26° C. and $CH_3CO_2Na.3H_2O$ begins to crystallize. This activates the movement of the atoms in the liquid phase, starting crystallization of $CO(NH_2)_2$, too. The sample temperature rises up to 30° C. Thereafter, $CH_3CO_2Na.3H_2O$ and $CO(NH_2)_2$ are crystallized as a eutectic composition, whereupon the heat accumulated during melting is released.

Such effect is not limited to the compositions close to the eutectic composition of $CH_3CO_2Na.3H_2O$ and $CO(NH_2)_2$ but is also attainable with the compositions remote from said eutectic composition, such as a composition with 20% by weight $CO(NH_2)_2$. So, we here describe a heat accumulative material prepared by adding 0.1% by weight of $Na_4P_2O_7.10H_2O$ as crystal nucleus forming medium to a mixture comprising 20% by weight of $CO(NH_2)_2$ and 80% by weight of $CH_3CO_2Na.3H_2O$. This heat accumulative material was heated to 55° C., and after maintaining the heated state for a given period of time, it was cooled. When this heat accumulative material was cooled to 35° C., its supercooling gave way and $CH_3CO_2Na.3H_2O$ began to crystallize. At this time, the sample temperature elevated to around 40° C. Crystallization of $CH_3CO_2Na.3H_2O$ further advanced with cooling. When the sample temperature dropped to 29° C., crystallization of $CO(NH_2)_2$ began and the sample temperature rose to 30° C. Thereafter, $CH_3CO_2Na.3H_2O$ and $CO(NH_2)_2$ were crystallized as a eutectic composition.

In case no crystal nucleus forming medium was added to the mixture of $CH_3CO_2Na.3H_2O$ and $CO(NH_2)_2$, no solidification of the mixture occurred nor took place any release of latent heat even when the mixture was cooled down to around 10° C.

Now, the invention is further described by way of the embodiments thereof.

EXAMPLE 1

A mixture consisting of 600 g of $CH_3CO_2Na.3H_2O$, 230 g of $CO(NH_2)_2$ and 0.5 g of $Na_4P_2O_7.10H_2O$ was placed in a cylindrical container of 100 mm in inner diameter and 100 mm in length, and the container was sealed with a plug having a tube incorporating a thermocouple. The container was put into a water bath and subjected to repetitive heating and cooling at temperatures between 45° C. and 10° C. This heat accumulative material showed almost no supercooling and repeated melting and solidification in a stable way.

Figure 3:
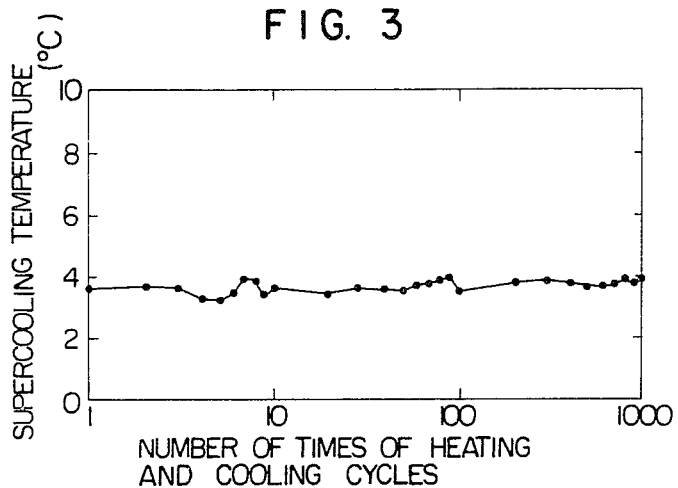
FIGS. 3 to 11 are the graphs showing the patterns of change of the degree of supercooling when the heat accumulative material samples of the respective examples according to this invention have been subjected to the continuous 1,000 times of heating and cooling cycles.

FIG. 3 shows the pattern of change of the degree of supercooling, that is, the difference between the solidification temperature and the temperature at which supercooling breaks down, in the successive 1,000 times of heating and cooling cycles. In the graph, the number of times of repetition of the heating-cooling cycle is plotted as abscissa on a logarithmic scale and the degree of supercooling (°C.) as ordinate. It is seen from this graph that the heat accumulative material of this example is stabilized in the degree of supercooling (which is defined in the range of 3°–4° C.) and its supercooling preventing function keeps working effectively without deterioration throughout the 1,000 times of repetition of heating and cooling. The latent heat of fusion of this heat accumulative material was 46 cal/g, indicating a sufficient heat accumulating capacity of this material for practical uses.

EXAMPLE 2

Figure 4:
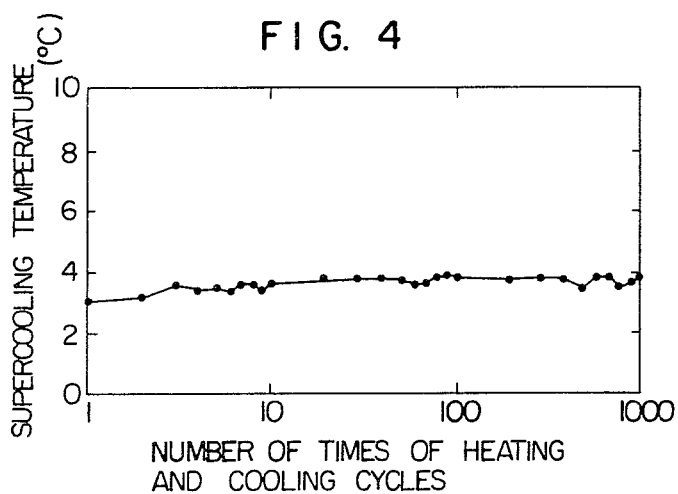

A mixture consisting of 600 g of $CH_3CO_2Na.3H_2O$, 320 g of $CO(NH_2)_2$ and 0.5 g of $Na_4P_2O_7$ was put into a container similar to that used in Example 1 and subjected to repetititve heating and cooling cycles between 45° C. and 10° C. after the manner of Example 1. The heat accumulative material of this example reiterated melting and solidification in a stable way. FIG. 4 shows the pattern of change of the degree of supercooling in successive 1,000 times of heating and cooling. It is seen from this figure that the heat accumulative material of this example can control the degree of supercooling in a limited range of 3°–4° C. and maintains its supercooling preventing function throughout 1,000 times of repetitive heat accumulating and heat releasing operations. The latent heat of fusion of the heat accumulative material of this example was measured to find it was 46 cal/g, which indicates plenty of heat accumulating capacity of this material for practical use as heat accumulative material.

EXAMPLE 3

Figure 5:
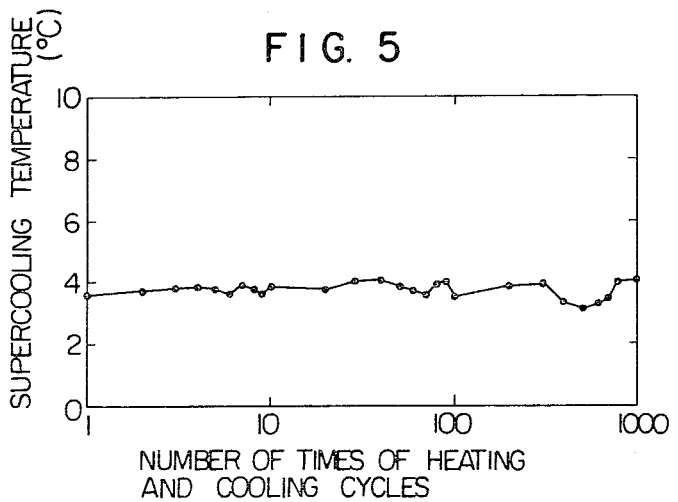

A mixture of 600 g of $CH_3CO_2Na.3H_2O$, 320 g of $CO(NH_2)_2$ and 1.0 g of $Na_3HP_2O_7$ was put into a similar container to that use in Example 1 and subjected to repeated heating and cooling between 45° C. and 10° C. in the same way as in Example 1. During this operation, the heat accumulative material of this example repeated melting and solidification stably. FIG. 5 shows the course of change of the degree of supercooling in continuous 1,000 repetitions of heating and cooling. It is seen from this figure that the heat accumulative material of this example can hold the degree of supercooling in a defined range of 3°–4° C. and maintains its supercooling preventing function with no deterioration throughout 1,000 times of repetition of heat accumulation and heat release. Measurement of the latent heat of fusion of the heat accumulative material of this example showed it was 46 cal/g, which is high enough for practical use of this material for the intended purpose.

EXAMPLE 4

A mixture of 600 g of $CH_3CO_2Na.3H_2O$, 320 g of $CO(NH_2)_2$ and 2 g of $Na_2H_2P_2O_7$ was contained in a container same as used in Example 1 and then subjected to repeated heating and cooling between 45° C. and 10°

Figure 6:
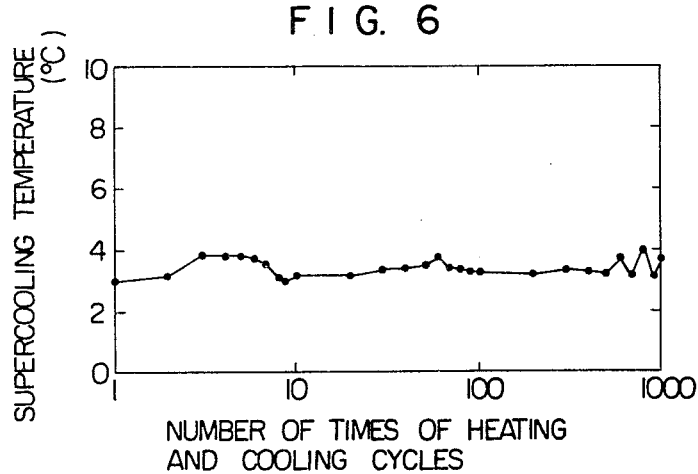

C. after the manner of Example 1. The heat accumulative material of this example repeated fusion and solidification in a stable way during the above-said operation. FIG. 6 shows the mode of change of the degree of supercooling in continuous 1,000 times of repetition of heating and cooling. It is seen from this diagram that the heat accumulative material of this example stays stable in the degree of supercooling, which is confined in the range of 3°-4° C., and can maintain its supercooling preventing function without suffering any deterioration throughout 1,000 times of repetition of heat accumulation and heat release. The latent heat of fusion of the heat accumulative material of this example was 45 cal/g, showing sufficient heat accumulating capacity of this material for its practical use.

EXAMPLE 5

Figure 7:
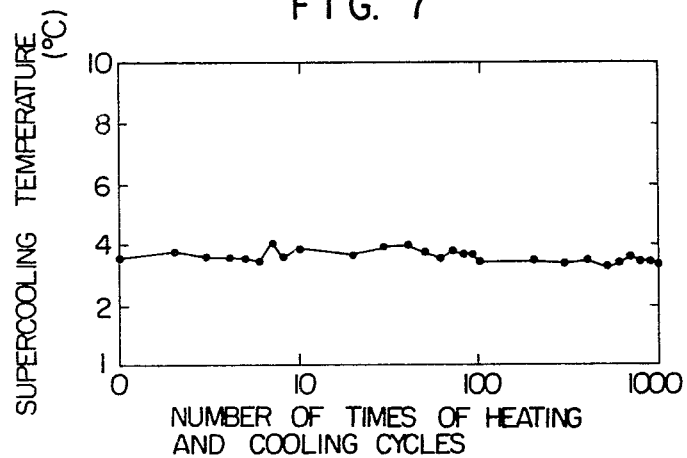

A mixture comprising 600 g of $CH_3CO_2Na.3H_2O$, 320 g of $CO(NH_2)_2$ and 0.5 g of $Na_2H_2P_2O_7.6H_2O$ was placed in a container similar to that used in Example 1 and subjected to repeated heating and cooling between 45° C. and 10° C. according to the process of Example 1. The heat accumulative material of this example repeated melting and solidification in a stable way during said operation. FIG. 7 shows the course of change of the degree of supercooling in successive 1,000 times of repetition of heating and cooling. It is appreciated from this diagram that the heat accumulative material of this example is limited in the degree of supercooling in the range of 3°-4° C. and maintains its supercooling inhibiting function with no fall throughout 1,000 times of repetition of heat accumulation and heat release. The latent heat of fusion of the heat accumulative material of this example was found to be 45 cal/g, high enough for practical application of this material.

EXAMPLE 6

Figure 8:
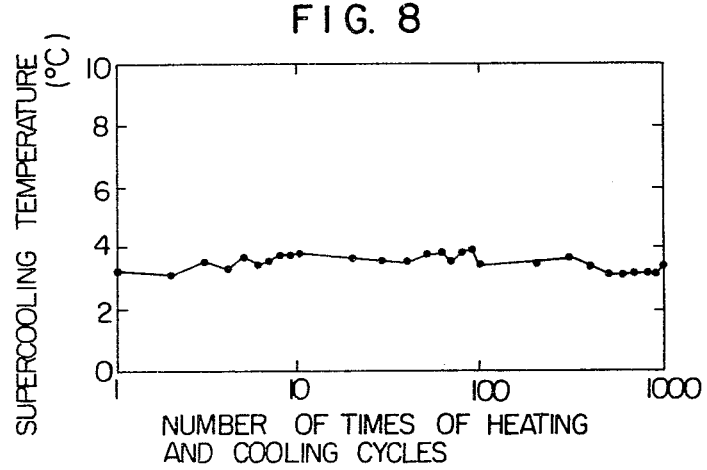

A mixture of 600 g of $NaCH_3COO.3H_2O$, 320 g of $CO(NH_2)_2$ and 5 g of $NaH_3P_2O_7$ was put into a container of the same type as used in Example 1 and then subjected to repeated heating and cooling between 45° C. and 10° C. after the manner of Example 1. The heat accumulative material of this example repeated melting and solidification in a stable way. FIG. 8 shows the way of change of the degree of supercooling in continuous 1,000 times of repetition of heating and cooling. The diagram shows that the heat accumulative material of this example can check supercooling in a limited range of 3°-4° C. and maintains its supercooling withholding function with no decline throughout 1,000 times of repetition of heat accumulation and heat release. The latent heat of fusion of the heat accumulative material of this example was determined to be 45 cal/g, indicating a sufficient heat accumulating capacity of this material for practical application.

EXAMPLE 7

Figure 9:
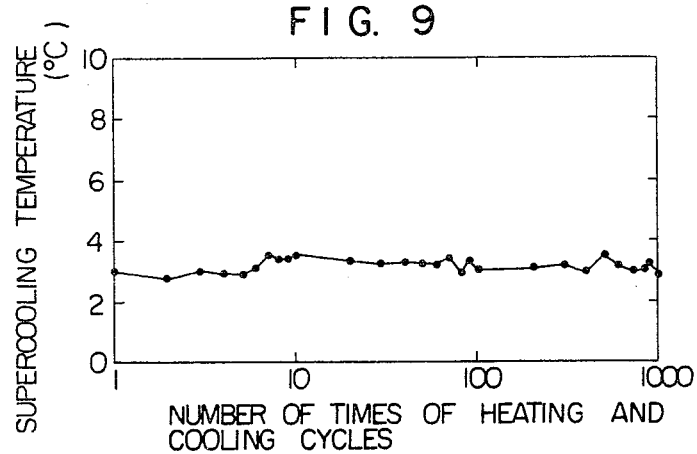

A mixture of 500 g of $CH_3CO_2Na.3H_2O$, 400 g of $CH_3CONH_2$ and 0.5 g of $Na_4P_2O_7.10H_2O$ was fed into a container similar to that of Example 1 and subjected to repeated heating and cooling between 40° and 5° C. It was observed that the heat accumulative material of this example repeated fusion and solidification in a stable way. FIG. 9 shows the course of change of the degree of supercooling that was observed in continuous 1,000 times of heating and cooling cycles. The diagram shows that the heat accumulative material of this example keeps the degree of supercooling in the range of 3°-4° C. and maintains its supercooling inhibiting function with no decline throughout 1,000 times of repetitive runs of heat accumulation and heat release. The latent heat of fusion of the heat accumulative material of this example recorded 48 cal/g, showing a plentenous heat accumulating capacity of this material for the envisaged practical use thereof.

EXAMPLE 8

Figure 10:
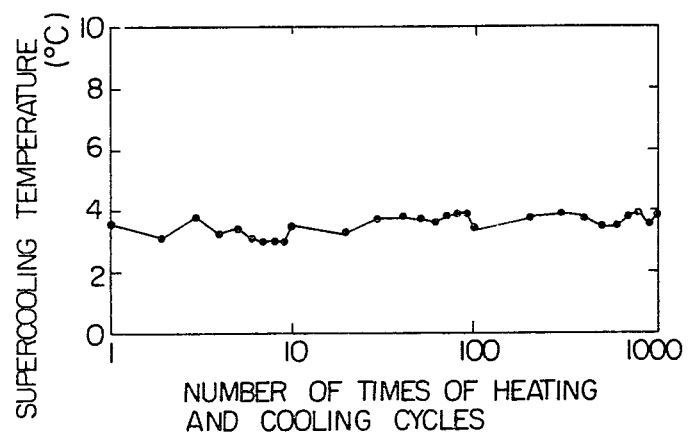

A mixture of 800 g of $CH_3CO_2Na.3H_2O$, 150 g of $NH_2CH_2CO_2H$ and 0.5 g of $Na_4P_2O_7.10H_2O$ was placed in a container same as used in Example 1 and then subjected to repeated heating and cooling cycles between 60° C. and 30° C. During this operation, the heat accumulative material of this example repeated melting and solidification in a stable way. FIG. 10 shows the course of change of the degree of supercooling in successive 1,000 times of repetition of heating and cooling. It is noted from this diagram that the heat accumulative material of this example can stably control the degree of supercooling within the range of 3°-4° C. and can perform its supercooling preventing function without suferring any deterioration throughout 1,000 times of repeated heat accumulation and heat release. Measurement of the latent heat of fusion of the heat accumulative material of this example showed it was 53 cal/g, which is high enough for practical use of this material for the intended purposes.

EXAMPLE 9

Figure 11:
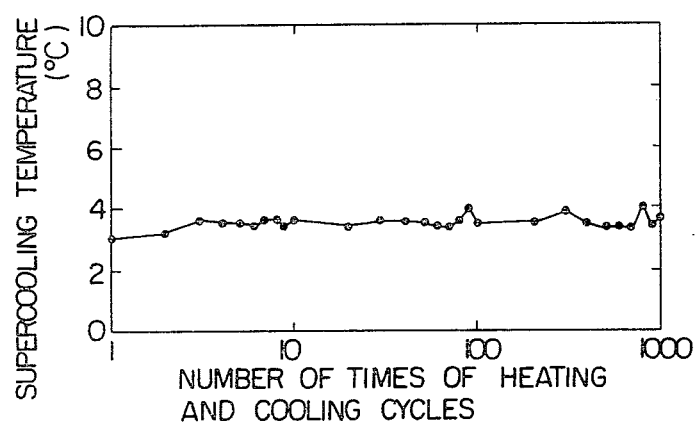

A mixture composed of 900 g of $CH_3CO_2Na.3H_2O$, 80 g of $CH_3(NH_2)CH-CO_2H$ and 0.5 g of $Na_4P_2O_7.10H_2O$ was put into a container similar to Example 1 and subjected to repeated heating and cooling between 65° C. and 40° C. The heat accumulative material of this example repeated fusion and solidification in a stable way. FIG. 11 shows the wake of change of the degree of supercooling that was observed in continuous 1,000 times of repetition of heating and cooling cycles. It is appreciated from this diagram that the heat accumulative material of this example remains stabilized in the degree of supercooling, which is confined within the range of 3°-4° C., and can maintain its supercooling withholding function with no setback throughout 1,000 times of repetition of heat accumulation and heat release. The latent heat of fusion of the heat accumulative material of this example was determined to be 57 cal/g, indicating an ample potential of heat accumulation of this material in practical use thereof.

EXAMPLE 10

400 kg of $CH_3CO_2Na.3H_2O$, 75 kg of $NH_2CH_2CO_2H$ and 10 g of $Na_4P_2O_7.10H_2O$ were fed into a heater-incorporated cylindrical container measuring 80 cm in inner diameter and 90 cm in height, and the container was sealed with a cover provided with a tube having a thermocouple inserted thereinto. The mixture was heated to 65° C. by the heater in the container to accumulate heat, and after confirming complete meltdown of $CH_3CO_2Na.3H_2O$ and $NH_2CH_2CO_2H$, heating by the heater was stopped and the melt was cooled, whereby supercooling broke down at 43.5° C. and the internal temperature of the container rose to 47.2° C. This was followed by 50 times of alternate heating and cooling to reiterate heat accumulation and heat release. Observation showed that the degree of supercooling stayed stably in the range of 3°-4° C., and it could be confirmed that the composition of this example can well function as a heat accumulative material.

COMPARATIVE EXAMPLE 1

A mixture composed of 600 g of $CH_3CO_2Na.3H_2O$ and 350 g of $CO(NH_2)_2$ was placed in a container similar to that used in Example 1 and the mixture was heated to 45° C. After the mixture has been completely melted down, it was again cooled, but supercooling would not give way even when the melt was cooled down to 10° C., and it was impossible to take out the accumulated latent heat.

COMPARATIVE EXAMPLE 2

A mixture of 500 g of $CH_3CO_2Na.3H_2O$ and 400 g of $CH_3CONH_2$ was put into a container same as used in Example 1, followed by heating to 40° C. After complete meltdown of the mixture, it was again cooled, but no breakdown of supercooling occurred even when the melt was cooled down to 5° C., and it was impossible to take out the accumulated latent heat.

COMPARATIVE EXAMPLE 3

A mixture of 800 g of $CH_3CO_2Na.3H_2O$ and 150 g of $NH_2CH_2CO_2H$ was put into a container such as used in Example 1. followed by heating of the mixture to 60° C., and after the mixture has been completely melted, it was again cooled, but supercooling did not give way even after cooling to 30° C., and it was impossible to take out the accumulated latent heat.

COMPARATIVE EXAMPLE 4

A mixture of 900 g of $CH_3CO_2Na.3H_2O$ and 80 g of $CH_3(NH_2)CHCO_2H$ was put into a container similar to that of Example 1 and heated to 65° C. After the mixture has been completely melted down, it was again cooled, but supercooling did not give way even when the melt was cooled to 40° C., and it was impossible to take out the accumulated latent heat.

As described above, the heat accumulative material of this invention is one which comprises a $CH_3CO_2Na$-$H_2O$ system mixed with at least one compound selected from the group consisting of $CO(NH_2)_2$, $CH_3CONH_2$, $HCONH_2$, $NH_2CH_2CO_2H$ and $CH_3(NH_2)CHCO_2H$, so that this material can be controlled in both heat accumulating temperature and heat releasing temperature by varying the compositional ratios and is also stabilized in heat absorbing and evolving performance and high in heat accumulating capacity. Further, it is possible to very effectively control supercooling of the compositions by adding at least one compound selected from the group consisting of $Na_4P_2O_7$, $Na_3HP_2O_7$, $Na_2H_2P_2O_7$ and $NaH_3P_2O_7$ as crystal nucleus forming medium to the compositions comprising a $CH_3CO_2Na$-$H_2O$ system mixed with at least one compound selected from the group consisting of $CO(NH_2)_2$, $CH_3CONH_2$, $NH_2CH_2CO_2H$ and $CH_3(NH_2)CHCO_2H$.

It is of course possible in this invention to jointly use a suitable melting point depressant, other types of crystal nucleus forming material, a thickner for preventing precipitation or coagulation of the crystal nucleus forming material, and/or other suitable additives as desired.

As explained above, the heat accumulative material according to this invention is not only appliable to the heat accumulating devices for air conditioning such as cooling and heating but also finds its application in all the fields where latent heat is utilized.

What is claimed is:

1. A heat accumulative material comprising a system containing three or more components, consisting of sodium acetate ($CH_3COONa$) and water ($H_2O$), mixed with at least one component selected from the group consisting of urea ($CO(NH_2)_2$), acetamide ($CH_3CONH_2$), formamide ($HCONH_2$), glycine ($NH_2CH_2COOH$) and alanine ($CH_3(NH_2)CHCOOH$), wherein $CH_3COONa$ is contained in an amount within the range of 10 to 70% by weight, and $H_2O$ is contained in an amount within the range of 10 to 55% by weight, $CO(NH_2)_2$ is contained, if present, in an amount of 65% by weight or less (exclusive of 0%), $CH_3CONH_2$, if present, is contained in an amount of 80% by weight or less (exclusive of 0%), $HCONH_2$, if present, is contained in an amount of 50% by weight or less (exclusive of 0%), $NH_2CH_2COOH$, if present, is contained in an amount of 40% by weight or less (exclusive of 0%), $CH_3(NH_2)CHCOOH$, if present, is contained in an amount of 35% by weight or less (exclusive of 0%).

2. The heat accumulative material according to claim 1, wherein the system consisting of $CH_3COONa$ and $H_2O$ is mixed with $CO(NH_2)_2$ to form a ternary composition, the amount of $CH_3COONa$ is within the range of 20 to 70% by weight and the amount of $H_2O$ is within the range of 15 to 50% by weight.

3. The heat accumulative material according to claim 1, wherein the system consisting of $CH_3COONa$ and $H_2O$ is mixed with $CH_3CONH_2$ to form a ternary composition, the amount of $CH_3COONa$ is within the range of 10 to 70% by weight and the amount of $H_2O$ is within the range of 10 to 50% by weight.

4. The heat accumulative material according to claim 1, wherein the system consisting of $CH_3COONa$ and $H_2O$ is mixed with $HCONH_2$ to form a ternary composition the amount of $CH_3COONa$ is within the range of 30 to 70% by weight and the amount of $H_2O$ is within the range of 15 to 45% by weight.

5. The heat accumulating material according to claim 1, wherein the system consisting of $CH_3COONa$ and $H_2O$ is mixed with $NH_2CH_2COOH$ to form a ternary composition, the amount of $CH_3COONa$ is within the range of 30 to 70% by weight, and the amount of $H_2O$ is within the range of 20 to 50% by weight.

6. The heat accumulative material according to claim 1, wherein the system consisting of $CH_3COONa$ and $H_2O$ is mixed with $CH_3(NH_2)CHCOOH$ to form a ternary composition, the amount of $CH_3COONa$ is within the range of 35 to 70% by weight, and the amount of $H_2O$ is within the range of 20 to 55% by weight.

7. The heat accumulative material according to claim 1, wherein the system consisting of $CH_3COONa$ and $H_2O$ is mixed with $CO(NH_2)_2$ and $NH_2CH_2COOH$ to form a quaternary composition, the amount of $CH_3COONa$ is within the range of 20 to 70% by weight, and the amount of $H_2O$ is within the range of 15 to 50% by weight, and the amount of $NH_2CH_2COOH$ is within the range not greater than 30% by weight (exclusive of 0%) based on the total weight of the four components.

8. A heat accumulative material comprising a system consisting of $CH_3CO_2Na$ and $H_2O$, mixed with at least one compound selected from $CO(NH_2)_2$, $CH_3CONH_2$, $NH_2CH_2CO_2H$ and $CH_3(NH_2)CHCO_2H$, the composition being further added with at least one compound selected from sodium pyrophosphate ($Na_4P_2O_7$), trisodium monohydrogenpyrophosphate ($Na_3HP_2O_7$), disodium dihydrogenpyrophosphate ($Na_2H_2P_2O_7$) and monosodium trihydrogenpyrophosphate ($NaH_3P_2O_7$) as crystal nucleus forming material.

9. The heat accumulative material according to claim 8, wherein $Na_4P_2O_7$ is $Na_4P_2O_7 \cdot 10H_2O$, and $Na_2H_2P_2O_7$ is $Na_2H_2P_2O_7 \cdot 6H_2O$.

10. The heat accumulative material according to claim 8, wherein the amount of at least one compound selected from $Na_4P_2O_7$, $Na_3HP_2O_7$, $Na_2H_2P_2O_7$ and $NaH_3P_2O_7$ mixed as crystal nucleus forming material is 40 parts by weight or less to 100 parts by weight of the composition comprising a $CH_3CO_2Na$-$H_2O$ system mixed with at least compound selected from $CO(NH_2)_2$, $CH_3CONH_2$, $NH_2CH_2CO_2H$ and $CH_3(NH_2)CHCO_2H$.

* * * * *